(12) United States Patent
Mason et al.

(10) Patent No.: US 8,650,072 B2
(45) Date of Patent: Feb. 11, 2014

(54) SYSTEM AND METHODS FOR PROVIDING LOCATION BASED DISCOUNT RETAILING

(75) Inventors: Andrew Mason, Chicago, IL (US); Don A. Chennavasin, Santa Clara, CA (US); Suneel Gupta, Chicago, IL (US); David Jesse, Wilmette, IL (US); Brett R. Keintz, Chicago, IL (US); Yishai Lerner, San Francisco, CA (US); Mihir Shah, San Francisco, CA (US); Brian M. Stolte, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 19 days.

(21) Appl. No.: 13/050,771

(22) Filed: Mar. 17, 2011

(65) Prior Publication Data

US 2011/0313840 A1 Dec. 22, 2011

Related U.S. Application Data

(63) Continuation-in-part of application No. 12/776,028, filed on May 7, 2010, which is a continuation-in-part of application No. 12/592,947, filed on Dec. 4, 2009.

(60) Provisional application No. 61/448,532, filed on Mar. 2, 2011, provisional application No. 61/450,090, filed on Mar. 7, 2011, provisional application No. 61/215,453, filed on May 5, 2009.

(51) Int. Cl.
*G06Q 30/00* (2012.01)

(52) U.S. Cl.
USPC ........................................... 705/14.1

(58) Field of Classification Search
USPC ........................................... 705/14.1
See application file for complete search history.

(56) References Cited

U.S. PATENT DOCUMENTS

| | | | |
|---|---|---|---|
| 5,715,445 A | 2/1998 | Wolfe | |
| 5,870,770 A | 2/1999 | Wolfe | |
| 5,946,682 A | 8/1999 | Wolfe | |
| 5,970,470 A | 10/1999 | Walker et al. | |
| 6,006,252 A | 12/1999 | Wolfe | |
| 6,049,778 A | 4/2000 | Walker et al. | |
| 6,101,484 A | 8/2000 | Halbert et al. | |

(Continued)

FOREIGN PATENT DOCUMENTS

| | | |
|---|---|---|
| KR | 10-2008-0036829 A | 4/2008 |
| WO | WO 00/79456 A2 | 12/2000 |

(Continued)

OTHER PUBLICATIONS

Anand, Krishnan et al., "Group Buying On The Web: A Comparison of Price-Discovery Mechanisms", *Management Science*, 2003, vol. 49, No. 11, pp. 1546-1562.

(Continued)

*Primary Examiner* — Daniel Lastra
(74) *Attorney, Agent, or Firm* — Alston & Bird LLP

(57) ABSTRACT

Systems and methods are disclosed that provide offers for goods or services based on the locations of potential customers and the geographic locations of the merchant. The offers may be limited in quantity and acceptance and redemption of the offers may be limited in time. A unique identifier may be associated with each accepted offer. A merchant may have at least some control over the creation and rendering of one or more offers for the merchant's goods and services.

19 Claims, 9 Drawing Sheets

(56) References Cited

U.S. PATENT DOCUMENTS

| | | |
|---|---|---|
| 6,128,599 A | 10/2000 | Walker et al. |
| 6,151,603 A | 11/2000 | Wolfe |
| 6,154,172 A | 11/2000 | Piccionelli et al. |
| 6,249,772 B1 | 6/2001 | Walker et al. |
| 6,263,351 B1 | 7/2001 | Wolfe |
| 6,269,343 B1 | 7/2001 | Pallakoff |
| 6,292,813 B1 | 9/2001 | Wolfe |
| 6,301,576 B1 | 10/2001 | Wolfe |
| 6,327,573 B1 | 12/2001 | Walker et al. |
| 6,336,131 B1 | 1/2002 | Wolfe |
| 6,341,305 B2 | 1/2002 | Wolfe |
| 6,415,262 B1 | 7/2002 | Walker et al. |
| 6,463,265 B1 | 10/2002 | Cohen et al. |
| 6,477,581 B1 | 11/2002 | Carpenter et al. |
| 6,584,451 B1 | 6/2003 | Shoham et al. |
| 6,604,089 B1 | 8/2003 | Van Horn et al. |
| 6,604,103 B1 | 8/2003 | Wolfe |
| 6,631,356 B1 | 10/2003 | Van Horn et al. |
| 6,754,636 B1 | 6/2004 | Walker et al. |
| 6,778,837 B2 | 8/2004 | Bade et al. |
| 6,836,476 B1 | 12/2004 | Dunn et al. |
| 6,876,983 B1 | 4/2005 | Goddard |
| 6,918,039 B1 | 7/2005 | Hind et al. |
| 6,928,416 B1 | 8/2005 | Bertash |
| 6,931,130 B1 | 8/2005 | Kraft, IV et al. |
| 6,934,690 B1 | 8/2005 | Van Horn et al. |
| 6,937,868 B2 | 8/2005 | Himmel et al. |
| 6,970,837 B1 | 11/2005 | Walker et al. |
| 6,970,922 B1 | 11/2005 | Spector |
| 6,985,879 B2 | 1/2006 | Walker et al. |
| 7,000,116 B2 | 2/2006 | Bates et al. |
| 7,007,013 B2 | 2/2006 | Davis, II et al. |
| 7,039,603 B2 | 5/2006 | Walker et al. |
| 7,043,526 B1 | 5/2006 | Wolfe |
| 7,080,029 B1 | 7/2006 | Fallside et al. |
| 7,103,365 B2 | 9/2006 | Myllymaki |
| 7,103,565 B1 | 9/2006 | Vaid |
| 7,103,594 B1 | 9/2006 | Wolfe |
| 7,107,228 B1 | 9/2006 | Walker et al. |
| 7,107,230 B1 | 9/2006 | Halbert et al. |
| 7,113,797 B2 | 9/2006 | Kelley et al. |
| 7,124,099 B2 | 10/2006 | Mesaros |
| 7,124,107 B1 | 10/2006 | Pishevar et al. |
| 7,124,186 B2 | 10/2006 | Piccionelli |
| 7,146,330 B1 | 12/2006 | Alon et al. |
| 7,181,419 B1 | 2/2007 | Mesaros |
| 7,194,427 B1 | 3/2007 | Van Horn et al. |
| 7,236,944 B1 | 6/2007 | Schwartz et al. |
| 7,246,310 B1 | 7/2007 | Wolfe |
| 7,251,617 B1 | 7/2007 | Walker et al. |
| 7,257,604 B1 | 8/2007 | Wolfe |
| 7,263,498 B1 | 8/2007 | Van Horn et al. |
| 7,274,941 B2 | 9/2007 | Cole et al. |
| 7,289,815 B2 | 10/2007 | Gfeller et al. |
| 7,302,638 B1 | 11/2007 | Wolfe |
| 7,318,041 B2 | 1/2008 | Walker et al. |
| 7,340,691 B2 | 3/2008 | Bassett et al. |
| 7,349,879 B2 | 3/2008 | Alsberg et al. |
| 7,363,246 B1 | 4/2008 | Van Horn et al. |
| 7,376,580 B1 | 5/2008 | Walker et al. |
| 7,406,322 B2 | 7/2008 | McMahan et al. |
| 7,409,429 B2 | 8/2008 | Kaufman et al. |
| 7,428,418 B2 | 9/2008 | Cole et al. |
| 7,430,521 B2 | 9/2008 | Walker et al. |
| 7,433,874 B1 | 10/2008 | Wolfe |
| 7,447,642 B2 | 11/2008 | Bodin |
| 7,467,137 B1 | 12/2008 | Wolfe |
| 7,469,138 B2 | 12/2008 | Dayar et al. |
| 7,472,109 B2 | 12/2008 | Katibah et al. |
| 7,480,627 B1 | 1/2009 | Van Horn et al. |
| 7,529,542 B1 | 5/2009 | Chevion et al. |
| 7,536,385 B1 | 5/2009 | Wolfe |
| 7,539,742 B2 | 5/2009 | Spector |
| 7,577,581 B1 | 8/2009 | Schuyler |
| 7,589,628 B1 | 9/2009 | Brady, Jr. |
| 7,613,631 B2 | 11/2009 | Walker et al. |
| 7,627,498 B1 | 12/2009 | Walker et al. |
| 7,643,836 B2 | 1/2010 | McMahan et al. |
| 7,650,307 B2 | 1/2010 | Stuart |
| 7,672,897 B2 | 3/2010 | Chung et al. |
| 7,689,468 B2 | 3/2010 | Walker et al. |
| 7,689,469 B1 | 3/2010 | Mesaros |
| 7,693,748 B1 | 4/2010 | Mesaros |
| 7,693,752 B2 | 4/2010 | Jaramillo |
| 7,702,560 B1 | 4/2010 | Wiesehuegel et al. |
| 7,711,604 B1 | 5/2010 | Walker et al. |
| 7,720,743 B1 | 5/2010 | Marks |
| 7,725,480 B2 | 5/2010 | Bassett et al. |
| 7,734,779 B1 | 6/2010 | Piccionelli |
| 7,760,112 B2 | 7/2010 | Bauchot et al. |
| 7,774,453 B2 | 8/2010 | Babu et al. |
| 7,783,279 B2 | 8/2010 | Ramanathan et al. |
| 7,788,281 B2 | 8/2010 | Cole et al. |
| 7,791,487 B2 | 9/2010 | Meyer |
| 7,792,297 B1 | 9/2010 | Piccionelli et al. |
| 7,797,170 B2 | 9/2010 | Bodin |
| 7,848,765 B2 | 12/2010 | Phillips et al. |
| 7,860,753 B2 | 12/2010 | Walker et al. |
| 7,870,229 B2 | 1/2011 | Spector |
| 7,890,364 B2 | 2/2011 | Piccionelli |
| 8,010,417 B2 | 8/2011 | Walker et al. |
| 8,150,735 B2 | 4/2012 | Walker et al. |
| 8,301,495 B2 | 10/2012 | Mason |
| 8,355,948 B2 | 1/2013 | Mason |
| 2002/0023010 A1 | 2/2002 | Rittmaster et al. |
| 2002/0065713 A1 | 5/2002 | Awada et al. |
| 2002/0103746 A1 | 8/2002 | Moffett, Jr. |
| 2002/0188511 A1 | 12/2002 | Johnson et al. |
| 2003/0004802 A1* | 1/2003 | Callegari ............ 705/14 |
| 2003/0018559 A1 | 1/2003 | Chung et al. |
| 2004/0117246 A1 | 6/2004 | Applebaum |
| 2004/0148228 A1 | 7/2004 | Kwei |
| 2004/0186789 A1 | 9/2004 | Nakashima |
| 2004/0193489 A1 | 9/2004 | Boyd et al. |
| 2004/0243478 A1 | 12/2004 | Walker et al. |
| 2005/0075945 A1 | 4/2005 | Hodge et al. |
| 2005/0102156 A1 | 5/2005 | Linduff |
| 2005/0221841 A1 | 10/2005 | Piccionelli et al. |
| 2005/0245241 A1 | 11/2005 | Durand et al. |
| 2006/0069619 A1 | 3/2006 | Walker et al. |
| 2006/0085259 A1 | 4/2006 | Nicholas et al. |
| 2006/0089882 A1 | 4/2006 | Shimansky |
| 2006/0106678 A1 | 5/2006 | Walker et al. |
| 2006/0161599 A1 | 7/2006 | Rosen |
| 2006/0178932 A1 | 8/2006 | Lang |
| 2006/0195368 A1 | 8/2006 | Walker et al. |
| 2006/0224465 A1 | 10/2006 | Walker et al. |
| 2006/0224466 A1 | 10/2006 | Walker et al. |
| 2006/0224467 A1 | 10/2006 | Walker et al. |
| 2006/0235754 A1 | 10/2006 | Walker et al. |
| 2006/0242028 A1 | 10/2006 | Walker et al. |
| 2006/0242036 A1 | 10/2006 | Walker et al. |
| 2006/0265289 A1 | 11/2006 | Bellissimo |
| 2007/0061220 A1 | 3/2007 | Vaid |
| 2007/0150354 A1 | 6/2007 | Walker et al. |
| 2007/0156529 A1 | 7/2007 | Walker et al. |
| 2007/0198360 A1 | 8/2007 | Rogers et al. |
| 2007/0208625 A1 | 9/2007 | Walker et al. |
| 2007/0225077 A1 | 9/2007 | Piccionelli |
| 2007/0281692 A1 | 12/2007 | Bucher et al. |
| 2007/0288330 A1 | 12/2007 | Vaid |
| 2008/0004888 A1 | 1/2008 | Davis et al. |
| 2008/0027810 A1 | 1/2008 | Lerner et al. |
| 2008/0052186 A1 | 2/2008 | Walker et al. |
| 2008/0052189 A1 | 2/2008 | Walker et al. |
| 2008/0065565 A1 | 3/2008 | Walker et al. |
| 2008/0071622 A1 | 3/2008 | Walker et al. |
| 2008/0097857 A1 | 4/2008 | Walker et al. |
| 2008/0133336 A1 | 6/2008 | Altman et al. |
| 2008/0154714 A1 | 6/2008 | Liu et al. |

(56) References Cited

U.S. PATENT DOCUMENTS

| | | |
|---|---|---|
| 2008/0167991 A1 | 7/2008 | Carlson et al. |
| 2008/0201232 A1 | 8/2008 | Walker et al. |
| 2008/0208663 A1 | 8/2008 | Walker et al. |
| 2008/0242514 A1 | 10/2008 | Piccionelli et al. |
| 2009/0024484 A1 | 1/2009 | Walker et al. |
| 2009/0030776 A1 | 1/2009 | Walker et al. |
| 2009/0094109 A1 | 4/2009 | Aaronson et al. |
| 2009/0125414 A1 | 5/2009 | Kleinrock et al. |
| 2009/0150218 A1 | 6/2009 | Brunner et al. |
| 2009/0307067 A1 | 12/2009 | Obermeyer |
| 2009/0313109 A1 | 12/2009 | Bous et al. |
| 2010/0049601 A1 | 2/2010 | Walker et al. |
| 2010/0076832 A1 | 3/2010 | Cha |
| 2010/0114132 A1 | 5/2010 | Piccionelli et al. |
| 2010/0146604 A1 | 6/2010 | Piccionelli |
| 2010/0287103 A1 | 11/2010 | Mason |
| 2011/0054996 A1 | 3/2011 | Spector |
| 2011/0099082 A1 | 4/2011 | Walker et al. |
| 2011/0231321 A1 | 9/2011 | Milne |
| 2012/0054031 A9 | 3/2012 | Walker et at |

FOREIGN PATENT DOCUMENTS

| | | |
|---|---|---|
| WO | WO 00/79495 A2 | 12/2000 |
| WO | WO 01/08024 A2 | 2/2001 |
| WO | WO 01/11483 A2 | 2/2001 |
| WO | WO 01/50301 A2 | 7/2001 |
| WO | WO 2009/094385 A2 | 7/2009 |

OTHER PUBLICATIONS

Bermant, Charles, "ActBig: Save Big", Internetnews.com, Nov. 16, 1999, 3 pgs.

Davis Alan S., "Group Buying On The Internet", Seminar Presentation slides, University of Minnesota, MIS Research Center, Mar. 10, 2006, 10 pgs.

Editor, "Technology Drives ActBig "Next-Generation" GroupBuying Application", Market Wire, Feb. 29, 2005, 2 pgs.

Kauffman, Robert J. et al., "Bid Together, Buy Together: On The Efficacy Of Group-Buying Business Models In Internet Based Selling", paper prepared for the $5^{th}$ Annual University of Minnesota Electronic Commerce conference, Mar. 27-28, 2001, Carlson School of Management, University of Minnesota, MN, 44 pgs.

Rueb, Emily S., "Group Buying, Better Together", The New York Times City Blog, Feb. 16, 2010, 3 pgs.

Staff, "ActBig.com muscles in On group Buying Power", RedHerring.com, Oct. 13, 1999, 2 pgs.

Office Action issued in corresponding U.S. Appl. No. 12/592,947 dated Dec. 16, 2011, 9 pgs.

Office Action issued in corresponding U.S. Appl. No. 12/776,028 dated Mar. 20, 2012, 13 pgs.

Notice of Allowance for U.S. Appl. No. 12/592,947 dated Sep. 6, 2012.

Notice of Allowance for U.S. Appl. No. 12/776,028 dated Sep. 14, 2012.

International Search Report and Written Opinion for Application No. PCT/US2012/027616 dated Sep. 27, 2012.

US 6,047,266, 04/2000, Van Horn et al. (withdrawn)

\* cited by examiner

| My Stuff | My Groupons (5) | My Gifts (2) | My Gs (500) | My Account |

My Total to date: 500 Gs
<< shop rewards

My Activities    Show me Gs   Earned   Used   Awarded   All

| Earned: 20 Gs | Lorem ipsum dolor. | 1 week ago |
| Earned: 20 Gs | Bought (1) $20 Burgtime Groupon, Valued at $40. | 1 week ago |
| Earned: 250 Gs | Bought (1) $50 Spa Groupon, Valued at $100. | 2 weeks ago |
| Earned: 20 Gs | Tipped $50 Spa Groupon. Earned Tipper Badge. | 2 weeks ago |
| Earned: 37 Gs | Promoted Groupon on Facebook Wall Status. | 2 weeks ago |
| Earned: 50 Gs | Referred Jane Smithe to Groupon via Facebook. | 2 months ago |
| Earned: 100 Gs | Joined via Facebook Connect. | 3 months ago |
| Earned: 37 Gs | Lorem ipsum dolor. | 2 weeks ago |
| Earned: 50 Gs | Lorem ipsum dolor. | 2 months ago |
| Earned: 100 Gs | Lorem ipsum dolor. | 3 months ago |
| Earned: 100 Gs | Lorem ipsum dolor. | 3 months ago |

| Shop Promo | Learn How to Earn More Gs Promo | We Want Your Feedback Tell Us What You Think |

FIG. 6

SYSTEM AND METHODS FOR PROVIDING LOCATION BASED DISCOUNT RETAILING

PRIORITY CLAIM

This application claims the benefit of the filing date under 35 U.S.C. §119(e) of Provisional U.S. Patent Application Ser. No. 61/448,532, filed Mar. 2, 2011 and Provisional U.S. Patent Application Ser. No. 61/450,090, filed Mar. 7, 2011. All of the foregoing applications are hereby incorporated by reference.

This application is a continuation-in-part of co-pending U.S. patent application Ser. No. 12/776,028, filed May 7, 2010, entitled "System and Methods for Discount Retailing," which is a continuation-in-part of co-pending U.S. patent application Ser. No. 12/592,947 filed Dec. 4, 2009, entitled "System and Methods for Discount Retailing," which claims the benefit of the filing date under 35 U.S.C. §119(e) of Provisional U.S. Patent Application Ser. No. 61/215,453, filed May 5, 2009. All of the foregoing applications are hereby incorporated by reference.

TECHNICAL FIELD

The present disclosure relates to offering goods or services to users. The offering may be based on a potential customer's location in time (e.g., in real-time), a potential customer's expected location later in time, or may be based on other parameters. In some systems, etailers or merchants control the creation and rendering of one or more offers. Acceptance and redemption of the offers may be subject to a contingency and may be limited in time.

The disclosure further describes rendering web pages that have a fixed form but variable content. The system allows an etailer or merchant to tailor web content that includes customizing offers of goods and services. In some systems, the web site may render web pages not owned or controlled by the etailer or merchant. The etailer or merchant may manage or control selected parameters such as product and/or service offering and pricing. Etailers and/or merchants may post discounts, build in desired margins and make such offers subject to contingencies. Conditional offers may be contingent upon a realized number of sales (for each deal) or when a tipping point is achieved.

The disclosure further describes rendering a virtual storefront or one or more web pages. Some systems render some or all of a merchant's deals at a common location accessed through a persistent or substantially permanent address. The address may specify a protocol and an optional path for accessing its offerings.

Some systems reduce or eliminate the out-of-pocket expenses for advertising and marketing the goods or services that the merchant must usually pay, and the merchant receives the revenue generated from the sales of the discounted goods or services before actually providing those goods or services. Once the customer accepts an offer, payment information for that offer is exchanged, but no payment is actually made until the required number of offers are accepted.

The present disclosure further contemplates a reward or loyalty program used in conjunction with the merchant web page and discount retailing system. In the incentive or loyalty program, consumers are encouraged to collect points from that merchant, which can then be redeemed for awards either from that merchant or from other merchants in which different merchants have arranged such sharing of points.

Along those lines, the disclosure contemplates an exchange program in which customers that have already purchased deals (or have collected loyalty points from a particular merchant), can exchange those deals or points for money, loyalty or rewards points or other deals either with the particular merchant or with other merchants or with the owner and manager of the website. Accordingly, the exchange or exchange program allows members or groups of members to offer to sell or exchange their deals for money or other deals.

The disclosure further contemplates matching customers to a merchant's relevant goods or services in conjunction with the discount retailing system described herein. By obtaining information about or from customers, including their general demographic information, likes and dislikes, price range they are willing to spend, previous deals they enjoyed or did not enjoy, etc., a merchant's offers can be made that are more relevant or pertinent to that particular customer and thus have a better chance of being accepted.

Information about the customer can be obtained in many ways, including a customer profile that is set up by the customer or those that know the customer, culled from previous deals with that merchant or other merchants for which the customer has accepted deal offers, from the customer's ratings of those deals, customer questionnaires or surveys, a database about the customers that was created from one or more of the above, or created elsewhere altogether. Once information about a particular customer is known, the deals that are forwarded to that customer can be more relevant and more likely accepted.

Further, planning tools can be used to incorporate variables or restraints thereby limiting or expanding the number of customers to which a deal may be offered for various business reasons, such as no fewer than X customers or no greater than Y customers will be offered a particular deal. By optimizing each deal across all customers or a group of customers, these constraints can be used to attain the particular business goals. Using these and other tools, offers can be disseminated to users based on the user's profile, historical purchases, purchasing trends, and/or other user information. Users may be presented with a number of offers each day (or at other time periods) that are consistent with the user's requirements or purposes. In some systems, a user will receive offers that match their profiles.

Some systems do not process or include a tipping point. Merchants may post real-time offers directed to consumers within in the merchant's geographic vicinity rendering a secondary market. In these systems, the prices of the goods and/or services may be higher or lower than the price of the initial offerings. The systems may provide etailers and merchants with real-time control of their margins.

BACKGROUND

Retailing is the exchange—sale and purchase—of goods and services between a vendor or merchant and a consumer or customer. Typically, negotiation is absent between the vendor and consumer with respect to the terms of a sale or purchase of a good or service. Retailing characteristically employs a vendor-controlled format whereby the vendor determines which goods or services to offer for sale, when the goods or services will be offered for sale, and the non-negotiable fixed price at which the good or service will be sold.

In today's marketplace, a retailer or merchant may sell goods at a brick-and-mortar location, a virtual site or through a combination. In some instances, merchants can offer their goods and services on another website, such as Ebay®, in which the merchant lists its goods or services for price or auction. However, none of these websites allow the merchant to control a contingent offer based on the number of potential customers that accept the deal, and in which the deal only becomes valid if a certain number of customers accept the offer.

Discounts are an integral part of retail strategies for many goods and services. Vendors rely upon discounts for a variety of reasons, such as to promote new and existing goods and services and to increase the sales of that particular item or service, or to increase the sales of the merchant's other goods and services. Further, consumers rely upon discounts as a way to reduce their costs.

Discount techniques include providing coupons and rebates to potential customers, but these techniques have several disadvantages, such as a historically small percentage of consumer participation and fraud. Since the participation level is so small, merchants are forced to canvass an area to attract the correct demographic of potential customers for its products or services. Most of the coupons or rebates (or the advertisements containing the coupons or rebates) end up with consumers that do not need or want the goods or services.

Further, fraud is an increasing problem in that coupons may be copied, or rebates may be used to obtain cash back for goods and services that the fraudulent consumer never actually purchased.

Coupons and rebates may be distributed using direct mail, newspaper print, and magazines and have associated with them a low percentage of users of those actually receiving the coupons. Besides not being environmentally friendly due to paper waste, coupons and rebates may not be cost effective.

Further, advertising and marketing associated with coupons and rebates can be expensive when done through radio or television medium, and extremely ineffective when done through print advertisements. Regardless of the advertising medium however, there is very little reason for the consumer to pass along the advertisement or coupon to others, so that a merchant must advertise or market the discount to each individual.

A vendor offers coupons or rebates in the hopes of securing future sales at full retail prices, repeat sales and ultimately an increase in overall sales. Ultimately, vendors cannot offer goods and services at a discount unless the vendor can ensure a minimum number of sales to justify the discount.

Discounting techniques also include pricing curve group discount models, but traditional pricing curve group discount models confuse consumers and leave them feeling like they did not get the best possible deal.

The background fails to disclose systems that mutually satisfy the consumer with a discount and the vendor with a minimum number of sales, while at the same time providing the merchant with expense-free advertising and marketing for the goods or services. The background also fails to disclose a system in which an etailer or merchant can set up a store front through a web page on an existing website, in which the etailer or merchant controls the contingent deals offered to its potential consumers. The contingencies may be based on a level or number of acceptances, a time limit, and/or to a geographic region or area.

The background also fails to disclose systems that utilize the strength of a social network to distribute information about the discounts, and create an incentive for the customer to distribute the information about the discount.

Further, the background fails to disclose systems that pay the merchant for the sale of the discounted items sold up front, prior to the merchant having to provide the goods or services to the customer that has paid for those goods or services.

Likewise, the background fails to disclose systems that allow merchants to extend offers that are limited in time and/or quantity to consumers based on location-based services and interests of consumers accessible through mobile networks and mobile devices.

SUMMARY

The present disclosure is a system and the various methods to mutually satisfy the consumer with a discount for the purchase of goods or services on the one hand, and the merchant or vendor with a minimum number of sales at that discounted price. In some systems, an offer becomes valid when a predetermined number of offers are accepted. The systems may transmit multiple offers each day to remote users based on or related to the user's requirements, user's profile, user's past purchases, user's purchasing trends and/or other information. The system may provide real-time location-based services that provide offers for goods or services based on the current locations of potential customers and the geographic locations of the merchant or etailer. The system may also provide distributed control of the dynamic or static content rendering the offers by providing geographically dispersed merchants or etailers with real-time control and distribution of their offers/content.

Some systems allow etailers and merchants to control the display and transmission of offers for the merchant's goods or services without incurring the expense of advertising and/or marketing. Some systems may provide etailers or merchants with revenue generated from the sales of the discounted goods or services before delivering or providing those goods or services.

Once a customer accepts an offer, payment information for that offer is exchanged in some systems. However, if the offer is dependent on receiving a predetermined number of acceptances, no payment is made before the required number of acceptances is received. When an acceptance threshold is achieved, (e.g., the tipping point is reached), a settlement may occur thereafter.

Some systems offer discounted goods or services based on a location near where the user is located. Alternatively, some systems render such offers later in time when the user is expected to be near a location. The user may receive a time limited offer for goods or services that is contingent on the user's acceptance within a limited time and may require fulfillment or redemption within a predetermined period of time.

Some systems allow merchants or etailers to set up a storefront or web page on a website, such that some or all of the merchant's deals can be located at the web page and each deal can be displayed for predetermined period of time. While the page is accessible, potential customers may accept offers made through webpage by transmitting purchasing information to the site. The purchasing information may comprise electronic payment information that may include a credit card number. Depending on the contingency, settlement may occur when the minimum number of customers provide purchasing information, an order confirmation occurs, or upon the occurrence of an act in the order process (e.g., such as an order or service fulfillment).

Some systems allow etailers or merchants to promote their own deals through a substantially permanent address, e.g., a persistent uniform resource locator to a web page. This system may allow the merchant to manage the content of the deal or deals being offered. The merchant may establish and render the deal, including the price or the desired margin for the goods or services. The merchant may program or establish multiple parameters including: the minimum number of customers placing orders, required purchasing information, the threshold needed to accept an offer, the time limits to reach a minimum and/or a maximum number of acceptances (to the extent there is a maximum number of deals), etc. Further, the merchant may control the number of deals and the content rendering those deals.

The merchant can also hand over control of the content to an outside source, including a professional marketing organization or over to the company controlling the website that contains the merchant's web page.

Some systems allow merchants to create and revise deals in real time. Thus, there is no waiting for a deal to be completed before another deal is displayed. Multiple deals may be "running" and displayed at the same time, even if their start and end times differ and if the desired margin, discount, or percentage varies.

Some systems allow a customer or user to track, register or "follow" a particular etailer or merchant so that the customer is assured of quick access to the merchants' product or service offerings. By following a merchant or etailer, the customer or user's preferences may be known. This information may be further processes by a recommendation engine. Further, when customers follow a particular merchant, the merchant's deals may be transmitted to an audience that has expressed an interest at some time in the merchant's products or services, thereby increasing the chance and number of sales.

In some systems, the deals transmitted to the customer may be filtered, customized, and personalized based on prior product or service inquires, order bookings, delivery, requests to follow certain merchants, or other steps in the order process.

Each of the systems described may interface or become a unitary part of a distributed social network. The social networks may include Facebook® and Twitter®, for example. By integrating or serving as part of the social network, customers may further market products, modify group buying behavior, and drive use of a secondary market.

Some systems or platforms may make order recommendations or suggestions to a customer or to a group of customers based on historical data, profiles, geographic locations, individual or aggregate buying trends, or user interests.

Some systems also provide a merchant with inexpensive or free advertising and marketing of the particular goods or services being offered for sale, utilizing the strength of a social network, along with a guarantee that the sale price will only have to be honored if a minimum number of customers not only accept the offer, but also pay the discounted price in advance, for the goods or services. Accordingly, a merchant can provide a greater or deeper discount knowing that at least a certain number of sales will occur at that discount.

Since, in accordance with the present disclosure, the sales can be made at the time that the consumer decides to accept the offer, even before taking possession of the goods or receiving the services, and only if the minimum number of sales are attained, the money from the sales can be immediately (or soon thereafter) provided to the merchant, thereby providing the merchant with the revenue from the sale of the goods or services in advance of the merchant providing the goods or services to the customer.

The sale price may remain available for a limited time, for example, twelve hours or one day, or until the number of sales equals or exceeds the minimum or tipping point by a given amount. For example, the tipping point may be reached when 100 individuals accept an offer to purchase a discounted sandwich, and the offer ends when 200 individuals accept the offer to purchase the discounted sandwich.

Further, the discount available may be modified as the number of actual customers increase. For example, the first 25 customers to purchase an item may receive a 50% discount, while the next 25 customers for that same item receive a 40% discount, and so on. By creating these limitations on the discounts as the number of deals are accepted (and purchased); there is incentive for consumers to watch the deals carefully to be able to react quickly.

To participate or utilize some systems a merchant or vendor may be selected. The merchant may request to have its goods or services offered, or the company providing the services can solicit merchants to become part of the system. The vendor may be any individual or company that provides goods or services to a consumer, and may be local, national or global. The merchant's goods or services are identified for a discount offering and a minimum number of accepted deals, or the tipping point, is determined. The tipping point is defined as the minimum quantity of the particular goods or services to be accepted by the consumers, or the critical mass, in order to execute the sale of the goods or services. Typically, the vendor sets the tipping point.

Next, terms of the offer are determined and may include an increased margin, a discount or varying discounts to be provided, duration of the offer, maximum number, if any, of the goods or services the vendor is willing to offer for sale, expiration of the goods or services, or any other restrictions or limitation associated with the offer.

The discount offer is then exploited, either through a global communication network, such as the Internet, or through some other vehicle that will be accessible to consumers, such as an Intranet, email or another communication network. If the Internet is used, a website can be generated and updated with the offer such that consumers can accept the offer. Consumers can "sign up" for offers on the website and even to receive updates as they occur. "Signing up" may entail providing one or more of the following types of information: the name of the consumer, address of the consumer, email address, and a form of payment to purchase the discount offer, such as a credit card or debit card. Although signing up is not necessary to participate in the offers (one can accept an offer and provide payment information each time), by signing up, the consumer can more easily and more quickly take advantage of any offer.

Consumer participation is received in the way of accepted offers, and calculated in terms of the number of consumers that accepted the discount offer. If the number of consumers that participated by accepting the discount offer equals or exceeds the tipping point, then the offer of the sale of the good or service becomes valid or legitimate, and each customer that has accepted the offer is charged using their method of payment, i.e., credit card, debit card, Paypal®, or in other ways utilizing a method of payment. The customer is then provided with a receipt of purchase, such as an email, coupon, gift certificate, etc. that can be printed out for redemption (or used as a receipt on a cell phone, etc.).

At this time (or shortly thereafter), the merchant may receive a payment based on the previous agreement for a portion of the sale of the discounted goods or services, after taking out the cost charged by the owner of the system or platform.

The consumer may present the order acknowledgement, order confirmation, or delivery confirmation (or other indication of purchase such as a physical or electronic email or message) to the merchant, who may fulfill the deal upon the agreed price. Alternatively, the list of customers that accepted the (now valid) offer and purchased the discounted goods or services can be forwarded to the merchant for providing the goods or services in some systems or other validation processes may be used. The validation methods are neither exclusive as other validation methods may also be used, such as a combination of the methods.

Conversely, if the number of customers that participated by accepting the discount offer does not reach the tipping point in the allotted time, then the offer is rescinded or rejected, the consumer is not charged for the purchase, and the merchant does not receive a payment (or have to provide the goods or services).

Customers can also sign up to receive an email when the deal is announced, and can access the system through one of the many social networking website systems, such as Facebook® or Twitter®. Further, customers can set up an account for purchasing the deals and receive credits or money toward future deals by referring other customers to sign up and purchase a deal.

Some systems include an incentive program or loyalty program. The incentive program promotes or encourages specific actions or behavior of customers or consumers. In these systems, consumers may collect and redeem points. Points are redeemed for one or more awards, such as goods services or other deals. It is contemplated that an award may be monetary or non-monetary.

For purposes of this application, the loyalty or reward points termed herein as G-Points or simply Gs may be points collected which can be based on a number of items, such as the price of a discount offer that a consumer purchases, and the points termed herein as "Experience Points" or simply "Experiences" may be points collected based on use of the discount offer after purchase.

In some systems, Gs and Experiences may be collected for a variety of reasons, including, but not limited to, repeat customer purchases of the discount offer, the purchase of a certain good or service, the first time a purchase is made from a certain merchant or vendor, trying a new good or service for the first time, number of purchases of the discount offer over time, number of visits to the website on the Internet providing the discount offer, the number of visits to the vendor to fulfill the discount offer, a purchase that matches the tipping point or a purchase that exceeds the tipping point. Other examples of activities that can receive rewards include marketing, advertising, or sharing deals with others through various communication means, social networks or websites, such as email, Facebook®, Twitter®, etc.

Further, customers can be rewarded for other actions taken or even randomly, either periodically or from time to time. Top point earners (daily, monthly, annually, or cumulative) can be awarded additional points or prizes, such as parties, etc. Each city or local region may have an award for point totals, etc. Also, Gs or points may be awarded for reaching certain milestones, such as purchasing a certain number of deals within a set time frame. As an example, if a customer purchases five deals in a one month timeframe, that customer may receive 1000 reward points. Numerous award levels and milestones can be used.

The present disclosure contemplates that various terms of the points can be defined, for example, expiration and award. The points may either expire within a certain time frame or are good until redeemed. The award may be either monetary or non-monetary and may further include customized levels at which points can be collected as well as customized levels at which points can be redeemed. For example, one point can be collected for every dollar spent. As another example, 50 points can be redeemed for a value of ten dollars or for 10% off. In one embodiment, points can be redeemed at an Internet store such as a merchant or vendor that accepts points in exchange for a good or service. Points or Gs can also be redeemed on the featured deal that day or in a secondary marketplace that features recent or past merchants for the deal of the day.

Some systems include an exchange program in which customers that have already accepted an offer that has "tipped" or purchased deals, can exchange those deals for money, loyalty or rewards points (as described herein) or other deals. Accordingly, the exchange or exchange program allows members or groups of members to offer to sell or exchange their deals for money or other deals. As an example, if a customer has paid $25 for a deal for $50 off at a Chinese restaurant and that customer no longer plans to use that deal, the customer can sell the deal for $20, such that the individual purchasing the deal pays $20 and gets $50 off of the meal. Otherwise, the two can exchange deals so that one party receives a $50 deal at the Chinese restaurant and the other party receives a $50 deal for a massage. Anything of value, including loyalty or reward points can be exchanged.

To accommodate the purchase, sale or exchange of deals, some systems include an exchange where customers or members can list the deals they intend to sell (or buy) and other customers or members can make offers for the deals. As another example, a member that is about to have a $40 manicure looks to the exchange to see if there are any deals for sale. Even if there is a deal for $30 (that originally was purchased for $20), it is less than paying the full amount for the manicure.

In some systems, instead of offering the deals at the exchange for a specific amount, the potential purchasers can bid on the deals to obtain the maximum amount either less or more than the full price for the deal, depending on market conditions. Further, to provide a validation and accounting system, the purchase, sale and/or transfer of deals may be tracked to record the new owner of the particular deal transferred.

Some systems match customers to relevant goods or services in conjunction with the discount retailing system described herein. By obtaining information about or from customers, including their demographic profile, likes and dislikes, price range they are willing to spend, previous deals they enjoyed or did not enjoy, etc. offers can be made that are more relevant or pertinent to that particular customer and thus have a better chance of being accepted.

Information about the customer can be obtained in numerous ways, including a customer profile that is set up by the customer or those that know the customer, culled from previous deals that the customer accepted, from the customer's ratings of those deals, customer questionnaires or surveys, a database about the customers that was created from one or more of the above, or created elsewhere altogether. Once information about a particular customer is known, the deals that are forwarded to that customer can be more relevant to that customer and therefore more likely accepted.

Further, some systems may offer one deal to a group of customers one day and a different deal to a different group of customers that same day. Also, based on information about the customers, a particular deal may be offered to one group of customers one day and the same deal may be offered to a different group of customers a different day. As such, offering the same deal to different customers on different days allows the demand to be properly managed for the benefit of the merchant, which also reduces or avoids a poor user experience. For example, the experience of a customer being prevented from getting a reservation to a restaurant due to overwhelming demand from other customers.

In addition, numerous deals may be offered to different or multiple groups at the same or different times. Based on historical action and certain customer's responses to an offer, additional customers may be given the same offer. For example, if a group of customers is generated based on historical actions, and that group tends to accept offers similar to another group of customers (the second group being generated based on ratings of various deals), then if the first group accepts an offer by a certain percent (for example 10%), then the same offer should be made to the second group.

Customers may overlap into multiple groups (as long as they do not continue to receive the same offer multiple times; unless that is their preference). A computer program or algorithm using various filters and subroutines can keep track of the customer groups and which customers have received which offers. In this manner, a test group (or multiple test groups) can be generated and receive an offer. If the test group accepts the offer in certain quantities, the offer is made to some or all of the other groups (or to everyone). If the test group does not respond favorably by accepting the offer, the offer may be dropped altogether.

Some systems may extend real-time offers to consumers without necessarily utilizing a tipping point. Instead of requiring a certain number of consumers to agree to a deal before effecting the deal, merchants could offer deals based on considerations other than a tipping point. Such considerations may include, for example and without limitation, a consumer's location, off-peak hours, quantity of surplus product onsite, and/or availability of service. Moreover, offers could be presented to a consumer in response to a specific consumer request, or the system could present offers to the consumer without such a request.

In some systems, consumers interested in locating a type of product, service, entertainment, or so on may use a computer to visit a website on the Internet where real-time deals from merchants are collected in a database. Based on the consumer's interests and/or the consumer's prospective whereabouts, the website could display offers from merchants that are effective or will be effective when the consumer expects to come within the geographic vicinity of the merchant. Although consumers may have the ability to search for such offers, the merchants can control the details of the offer. As a most-basic example, a restaurant having a slow day could extend an offer for half-priced sandwiches during a particular timeframe of the day.

A consumer may also locate products, services, entertainment, or the like with a vehicle navigation system that knows the consumer's expected route. The navigation system, which may be configured with a global positioning system (GPS), could be in communication with the discount retailing system. Accordingly, the navigation system could display offers from the database that are nearby or upcoming along the consumer's expected route.

In some systems, the discount retailing system could operate with a mobile device application. Using a GPS or the like to identify the location of a consumer, the system could present offers from nearby merchants based on the interests or needs of the consumer. The consumer could run the application to locate nearby merchants offering deals on entertainment, food, haircuts, goods, and services, for example.

Some systems or platforms provide consumers with a discount on goods and services, while providing the merchant inexpensive or free advertising and marketing for those goods or services.

Some systems or platforms provide a guaranteed minimum number of sales of a particular item or service, otherwise no sale at that discounted price occurs—the sale only occurs if a minimum number of customers accept the deal.

Some systems or platforms allow the vendor to gain exposure to a new audience and create an incentive for the customer to market the deal to other customers, and to provide a vehicle, such as a website on the Internet, in which large numbers of consumers return to that particular vehicle to find out about new deals.

Some systems or platforms provide the merchant with revenue from the sales (if the minimum is attained and the offer becomes valid) prior to delivering the goods or providing the services to the customer.

Some systems or platforms increase sales, and advertising and marketing the merchant's goods or services.

Some systems or platforms provide an incentive or loyalty program to promote or encourage specific actions or behavior of the customers in order to collect and/or redeem points for monetary or non-monetary awards.

Some systems or platforms provide a system and methods for matching customers to relevant goods or services by obtaining information about customers and matching those customers to offers that are more relevant or pertinent to that particular customer and thus have a better chance of being accepted. This provides a more improved experience for the customer and an improved quality of customer being referred to the merchant, which is necessary for repeat business and greater profitability.

Some systems or platforms include an exchange program in which customers that have already purchased deals, can exchange those deals for money, loyalty or rewards points or other deals from other customers. The exchange or exchange program allows members or groups of members to participate in offers that have already ended, and to trade or sell offers that members will not be able to redeem. This maximizes the customers' use of a particular deal, and increases customer satisfaction.

These and other aspects, features, and advantages of the present disclosure will become more readily apparent from the attached drawings and the detailed description of the preferred embodiments, which follow.

BRIEF DESCRIPTION OF THE DRAWINGS

The appended drawings described herein are for illustration purposes only and are not intended to limit the scope of the present disclosure in any way.

FIG. 6 illustrates an exemplary personal account summary of the incentive program in accordance with the teachings of the present disclosure;

DETAILED DESCRIPTION OF THE DRAWINGS AND THE PRESENTLY PREFERRED EMBODIMENTS

Figure 1:
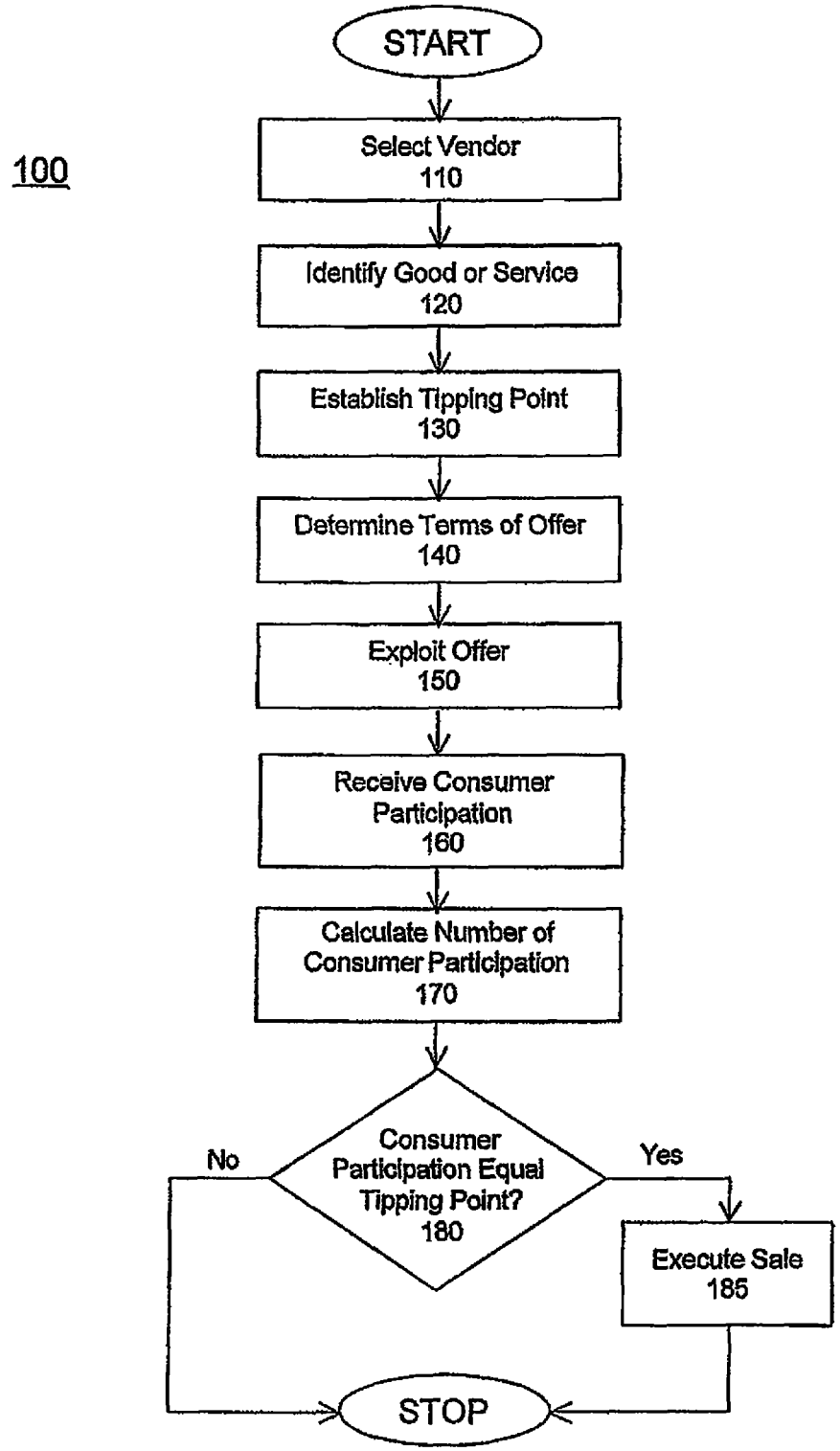
FIG. 1 illustrates a method for discount retailing in accordance with the teachings of the present disclosure.

FIG. 1 illustrates a method 100 for discount retailing in accordance with one embodiment of the present disclosure. As shown in FIG. 1, a vendor or merchant is selected and/or identified at step 110 for participation. The vendor may be any individual or entity that provides goods or services to a consumer. The vendor may be local, national or global in terms of the geography the vendor provides products or services. The provider of a discount retailing system or platform for implementing the method 100, for example, may solicit vendors for participation or the vendor may hear of the discount retailing system and may approach the system's provider without being solicited and request to have its goods or services offered to consumers via the discount retailing system. Additionally, a product or service provided by the vendor is identified for a discount offering at step 120. For example, a product or service may be identified by the vendor, the system provider and/or the discount retailing system. The good may be any product sold or distributed by the vendor, and the service likewise, can be any service provided by the vendor.

A tipping point is then determined at step 130. Again, the tipping point is defined as the minimum quantity of the good or service to be accepted by consumers in order to execute the sale of the good or service. The tipping point may be determined by the vendor, the system provider and/or the discount retailing system. In one embodiment, the vendor typically sets the tipping point. At step 140, terms of the discount offer are determined and include discount to be provided, duration of the offer, for example 24 hours, and maximum number, if any, of the good or service the vendor is willing to offer, expiration of the good or service, or restrictions associated with the good or service. The terms of the discount offer may also be determined by the vendor, the system provider and/or the discount retailing system.

At step 150 the discount offer is exploited. For example, the system provider, the vendor, partners, affiliates, and/or other third parties may promote the discount offer through a website on the Internet or other suitable communication methods, including but not limited to email and social media platforms such as Facebook®, Twitter®, LinkedIn®, etc. Consumers participate by accepting the offer such as by "signing up" for the offer on the website. "Signing up" may entail providing the name of the consumer, address of the consumer, and form of payment to purchase the offer. At step 160, the consumer participation is received and calculated in terms of the number of consumers that participated by accepting the discount offer at step 170. As shown by step 180 in FIG. 1, if the number of consumers that participated by accepting the discount offer equals the tipping point established at step 130, the sale of the good or service is executed at step 185. If the number of consumers that participated by accepting the discount offer does not equal the tipping point established at step 130, the offer is abandoned. The sale of the good or service is executed by providing the consumer with a gift certificate.

The following is discussed with reference to a restaurant discount of 50%, but is merely exemplary. The present disclosure is applicable to a variety of goods, services and discounts.

Vendor XYZ Restaurant, for example, is selected to participate in discount retailing. XYZ Restaurant serves Chicago, Ill. and the Chicago area. The tipping point is established at 25, which is the critical mass or minimum quantity that must be accepted by consumers in order to execute the sale of the offer. So, if 24 people accept the discount offer then the offer is abandoned and no consumer receives the discount.

Next, terms of the discount offer are determined. The discount to be provided by XYZ Restaurant is $20 in food for the cost of $10, provided the tipping point of 25 is met. Another term is that the offer will run for 8 hours, although any duration is contemplated. Another term may be that XYZ Restaurant will only provide a maximum of 100 discount offers, although any variation is contemplated, for example, terms of the discount offer could vary with respect to the number of consumers that accept the offer in excess of the tipping point. For example, the first 25 consumers that accept the discount offer receive the 50% discount. The subsequent consumers (number 26 through 50) to accept the offer receive a 40% discount, or $20 in food for the cost of $12. The next subsequent consumers (number 51 through 100) to accept the offer receive a 20% discount, or $20 in food for the cost of $16.

Another term may be that, provided the tipping point is met, the consumer must use the discount offer within two months otherwise it expires. Any expiration date is contemplated including no expiration. Yet another term may be that the discount is applicable to food only, not beverages, but again, any restriction is contemplated such as the discount only applies to alcoholic beverages.

Upon establishing the tipping point and determining the terms, the discount offer is exploited through a website on the Internet. Consumers accept the offer via the website and provide their name, address and credit card number. Upon or before the 8 hour duration ends, consumer participation is received by the system and the number of consumers that accepted the discount offer is calculated. In this example, 50 people accepted the offer, which meets and exceeds the tipping point of 25. Therefore, the discount offer is realized and the sale of the service is executed. Each consumer's credit card is charged $10 and the consumer receives a $20 gift certificate to XYZ Restaurant. Again, if the number of consumers that accepted the discount offer is calculated at any number less than 25, the discount offer is abandoned and the consumer's credit card is not charged.

Figure 4:
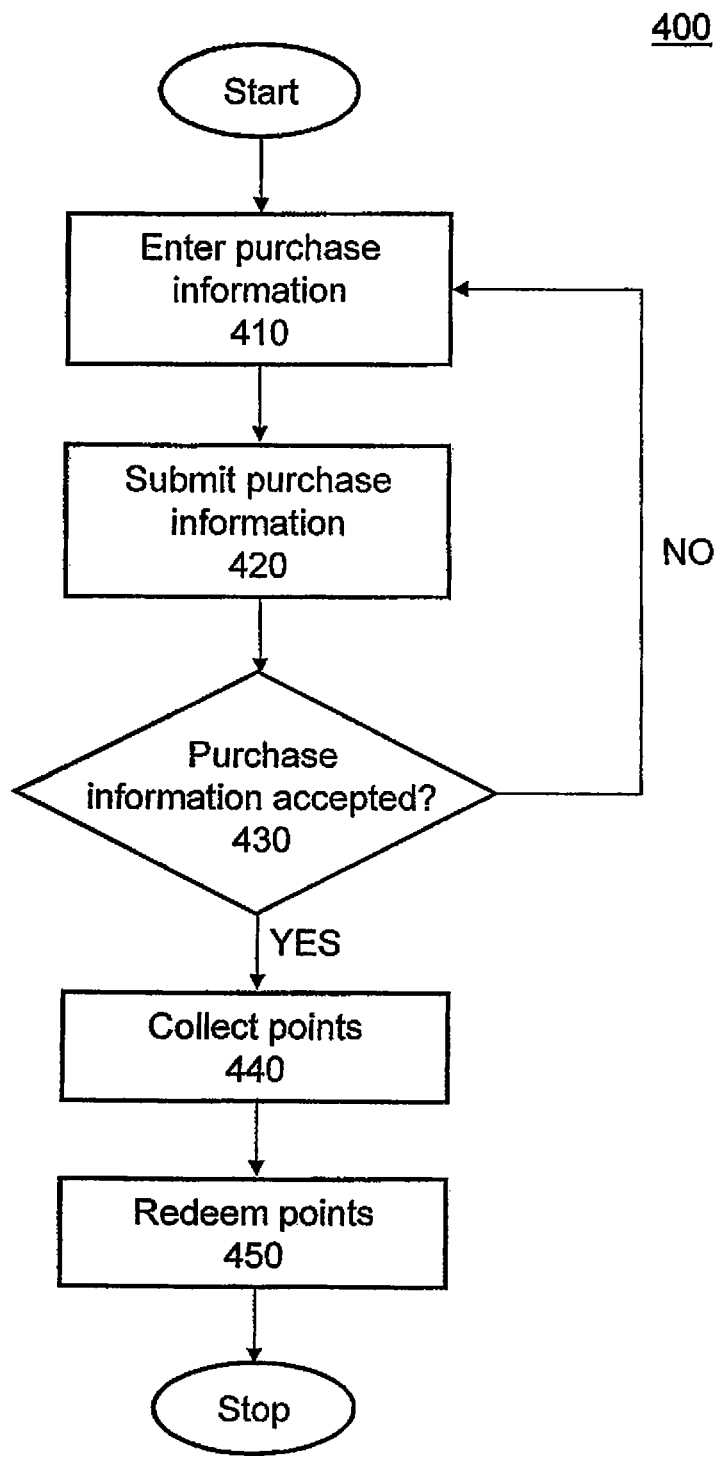
FIG. 4 illustrates an embodiment of an incentive program in accordance with the teachings of the present disclosure.

Another embodiment relates to an incentive or loyalty program used in conjunction with the discount retailing system. FIG. 4 is a flow chart 400 illustrating an embodiment of an incentive program within the scope of the present disclosure. When a sale is executed (see step 185 in FIG. 1), purchase information is entered as shown by step 410. Purchase information may include a description of the discount offer in terms of the good or service, quantity, price, and payment information. After purchase information is entered at step 410, it is submitted at step 420. After submission of the purchase information at step 420, it is determined if the purchase information is accepted at step 430. If the purchase information in not accepted at step 430, then the purchase information must be entered at step 410. Purchase information may not be accepted, for example when credit card information is invalid or the credit limit has been exceeded. If the purchase information is accepted at step 430, then points are collected at step 440. At step 450, the points are redeemed.

According to one embodiment, two types of points are contemplated: "G-Points" or simply "Gs" and "Experience Points" or simply "Experiences". Gs are points collected based on the price of the consumer purchase. For example, Gs may be collected at a level of one point per one cent such that a consumer purchasing the discount offer for five dollars collects 500 Gs. In addition, these Gs may be redeemed at a level of one point per one cent such that a consumer redeems 500 Gs to purchase a discount offer at five dollars.

Figure 5:
FIG. 5 illustrates an embodiment of an on-line G-store where G-points can be redeemed in accordance with the teachings of the present disclosure.

It is also contemplated that Gs may be redeemed at an Internet store such as a "G-store", which is a merchant or vendor that accepts points in exchange for a good or service. For example, Gs may be redeemed at a level of one point per one cent such that a consumer redeems 500 Gs to purchase a discount offer at five dollars. FIG. 5 illustrates an example of a G-store where G-Points can be redeemed. The G-store includes various goods and services for purchase using G-Points. It is further contemplated the G-store may include all or a portion of previous discount offers.

Experiences are points collected based on use of the discount offer after purchase. For example, if a consumer purchases a service such as a manicure from Vendor ABC and fulfills the offer by receiving the manicure, then the consumer obtains one Experience Point. Gs and Experiences may have different expirations and awards. For example, Gs may not have an expiration date and continue to accrue in the consumer's account while Experiences may expire after a certain time period.

In one embodiment, Experiences are collected at an award level of a three-tiered ladder defined by three statuses: bronze, silver and gold. The consumer must fulfill discount offers by either receiving the service or using the good to obtain an Experience Point. Three Experience Points achieve bronze status, five Experience Points achieve silver status and thirteen Experience Points achieve gold status. Although three, five and thirteen Experiences are discussed above, any number of Experiences are contemplated. Experiences are redeemed at a level of percentage off the sale price depending on the rung of the ladder achieved. For example, the bronze status is 10% off the sale price, silver status is 15% off the sale price, and gold status is 25% off the sale price. The Experience Points may be used toward the purchase of goods and services of the discount offer.

FIG. 6 illustrates a personal account summary of the incentive program within the scope of the present disclosure. G-Points and Experience Points may be stored by the system or platform and/or provided to the consumer, for example, via the system's website. As shown in FIG. 6, all G-Points and Experience Points collected may be listed in the personal account summary. Details on the collection and redemption of the G-Points and Experience Points may also be provided.

Another embodiment includes a deal exchange or exchange program that allows customers to exchange the deals that they have already purchased for money, loyalty points or for other deals owned by other customers. The exchange provides a tool or secondary market for customers or members (or groups of members) to offer to sell or exchange their purchased deals for money or something of value. The deal exchange may be a component of the discount retailing system or may be a separate component that interfaces with the discount retailing system, for example, via a telecommunications network.

As an example of the exchange program, if a customer has paid $25 for a deal for $50 off at a Chinese restaurant and that customer no longer plans to use that particular deal (either they do not like that restaurant, or the deal is getting ready to expire, or for any other reason), the customer can offer to sell the deal for $20. If such a sale is consummated, the individual purchasing the deal pays $20 and gets $50 off of the meal at the restaurant and the person selling the deal receives something instead of letting the deal expire.

Alternatively, the parties can exchange purchased deals so that one party receives a $50 deal at the Chinese restaurant and the other party receives a $50 deal for a massage, or a $40 deal for drinks at a bar. Anything of value, including loyalty or reward points can be exchanged.

To accommodate the purchase, sale or exchange of deals, the present disclosure contemplates an exchange or market where customers or members can list the deals they intend to sell (or buy), and other customers or members can make offers for the deals. The market can be open to everyone, to subscribers, or to a specified group such that only certain individuals in that specified group are allowed to offer and/or purchase deals.

As an example, a member that is about to have a manicure at Spa ABC looks to the exchange to see if there are any deals for sale for a manicure at Spa ABC. If the manicure cost $40, even if there is a deal for $30 that might have originally cost $20, the individual purchasing the deal pays less than the full amount for the manicure. As such, deals can be purchased and put up for sale on the exchange for a profit with the risk that no one will purchase the deal.

In another embodiment, instead of offering the deals on the exchange for a specific amount ($30 in the example above for the manicure at Spa ABC), the potential purchasers can place the deal on the exchange and let others bid on that deal, thereby potentially obtaining the maximum amount for the deal, but still less than the full price.

The exchange can incorporate numerous limitations on the purchase or sale of the deals. For example, the basic sale would include the sales price and when the deal was set to expire. However, additional information could include when the offer for the deal (not the deal itself) was set to expire, whether the deal was still valid, and reviews or recommendations from others that had taken advantage of the deal, etc. The exchange could also allow the merchants themselves to place additional offers on the exchange. These offers and the others can be indexed to allow for quick searching of the deals.

The exchange can allow for various forms of payment or trading of deals. Besides the conventional credit card or Paypal payments, the loyalty points described herein can be accepted by the exchange and used for the transaction. Further, the exchange may determine the value of the deal based on various factors, such as original price, time for expiration, customer reviews, etc. and a one deal may have a different value than the other deal and trading may involve additional compensation, either through a credit card payment or loyalty points.

Upon payment or trade, the ownership of the deal can be immediately transferred from one party to the other, as long as each party is a registered member of the discount retailing system, the exchange, or both. The system of the present disclosure can record the transfer of the deal from one member to the other for validation and accounting purposes at a later date if necessary. This transfer obviates any attempt for a deal to be redeemed twice. Further, the exchange may charge a varying or set amount for the listing, or charge a commission upon the sale and transfer.

The present disclosure further contemplates each of the above transactions occurring on the customer's computer or mobile telephone. Applications for mobile telephone use can be created that would allow for searching, purchasing and selling the deals for ease of use. Based on the GPS functionality of various cellular telephones, deals (both from the exchange and the discount retailing system) can be forwarded to members that are located near the place where the deal can be used. With this mobile application capability, a customer can access the system (or be sent a message that there is a deal nearby), search or be informed about a deal on a mobile telephone, purchase the deal, and walk into the merchant and obtain the goods or services.

In another embodiment, there is also provided a system for matching customers to goods or services that the customer would be more interested in purchasing. For example, a deal for $25 worth of alcohol at a sports bar in the Lincoln Park area of Chicago may be more relevant to a 25 year-old male living in the city of Chicago, than to a suburban housewife with two kids that play soccer (although maybe not). The system can obtain information about customers, including their residence, age, income, education, likes, dislikes; along with information pertaining to the previous deals they purchased, whether they enjoyed or did not enjoy those deals, etc, so as to determine user relevance for an offer. Once that information is entered into a database, more relevant offers can be made to a particular customer with a better chance of being accepted.

Information about customers may be obtained directly from the customer and from other sources. The customer can set up a customer profile at the time membership is commenced with updates to this information happening periodically. Further, those in the customer's group (if one is set up) can provide information and information can be culled from previous deals that the customer accepted and possibly rated. Also, customer questionnaires or surveys can be used to populate the customer database. Once information about a particular customer is known, the deals that are forwarded to that customer can be more relevant and more likely accepted.

Further, the discount retailing system may offer one deal to a customer or group of customers one day, and a different deal to a different customer or group of customers that same day. Based on information about the customers or the group of customers, it may be more advantageous to offer a particular deal to one group of customers one day, and the same deal to a different group of customers on a different day. As such numerous deals may be offered to different or multiple groups at the same (or different) times. The retailing system can utilize historical data to determine that based on certain customer's responses to an offer, additional customers may be given the same offer. For example, if a group of customers is generated based on historical activity, and that group tends to accept offers similar to another group of customers (the second group being generated based on ratings of various deals), then if the first group accepts an offer by a certain percent (for example 10%), then the same offer should be made to the second group. The retailing system can make these determinations on the fly as deals are accepted or rejected.

There is no limitation on the number of groups or even if certain customers overlap into multiple groups (as long as they do not continue to receive the same offer multiple times). A computer program or algorithm using various filters and subroutines can keep track of the customer groups and which customers have received which offers. In this manner, a test group (or multiple test groups) can be generated and receive an offer. If the test group accepts the offer in certain quantities, the offer can be made to some or all of the other groups (or to everyone). If the test group does not respond favorably by accepting the offer in enough quantity (different from the tipping point described above), the offer may be dropped altogether.

In addition to user relevance, the discount retailing system may also match customers to goods or service deals, for example, based on merchant attributes, such as the number of merchant reviews and merchant ratings, offer attributes, such as the amount of discount or attractiveness of service, and any other suitable information.

Further, the system may include a data analytics component for matching customers to goods or services based a various data collected about users by the system, data about users provided by the merchants, and data available from $3^{rd}$ party sources, including but not limited to: purchase demographics, including purchase locations by address, zip code, neighborhood, and reports showing such the above on geographical maps; historical purchase activity; full payment statistics that track return on investment for individual purchases; email send statistics, including open rates and click rates; percentage of unredeemed offers; merchant's ability to set cost of goods and returning customer assumptions in order to customize the return on investment calculation; return rates; redemption statistics (date, amount for ROI), etc.

In another embodiment, the user of the platform or system receives deal feed or a series of deals or offers based on time and/or relevance to the particular user. The relevance of the deals may be determined by an algorithm based on information about the user (from answering profile questions), the historical purchases of the user through the platform, and information about user available from $3^{rd}$ party sources. Also, the platform may rank deals and/or merchants based on their attributes so as to generate deal quality scores and merchant quality scores for determining the relevance of the deals. The platform may then use the deal quality scores and merchant quality scores in order to determine the relevance of the deals, and in what priority order to serve the deals. The deals may be displayed to the user depending on particular categories or divisions pertaining to the user, and also based on social media connections. For example, the user may receive input (deals) based on a friend that just bought a deal, or a friend that is following a merchant. Further, there may be comments, reviews or sharing of deals by friends and others that the user has a social media connection with.

The platform also allows a user to register, track or follow any type of entity, including another user unknown to that user, friends of that user on the platform, friends of the user on social media platforms such as Facebook®, Twitter®, LinkedIn®, etc., neighborhoods, zip codes, addresses, categories, merchants, and others. The platform may then aggregate and display deals or offers from other entities as part of a user's deal feed. Thus, the users can influence the content of their deal feeds through "following" merchants, categories, locations, etc.

In one embodiment, the platform or system may include a recommendation component configured to make deal recommendations or suggestions to a customer or to a group of customers based on user information available from any suitable source, including customer profiles, historical purchasing data through the platform, consumer interaction with the platform and the provider of the platform, demographic data, individual or aggregate buying trends, geographic location of the consumer, social networks, or any $3^{rd}$ party data source.

Further, the deals or offers may be sent to the user on the same web page or screen for ease of access and the platform provides the ability to review and purchase (accept) a discounted offer from within that page or screen without the need to access additional pages or screens. Further, the user can also share deals to others from within the web page or screen and control the filtering of the deals based on variables, such as location, category of goods, types of services, amount or percentage of discount, etc.

These deals or offers may be sent to the user on a variety of devices. For example, the user can receive this list of deals on a mobile device and accept or comment from the mobile device. Further, the list of deals provided to the user can be integrated to, or can allow the integration of, various social media platforms such as Facebook®, Twitter®, LinkedIn®, etc.

In another embodiment, the system or platform allows a merchant or vendor to set up a virtual storefront on the system's website described herein. The virtual storefront can be one or more web pages dedicated to that particular merchant, or it can consist of an entire website accessed through the original website. For ease of reference and not to be limited in scope, the virtual storefront will be considered as the merchant's web page on the system's website.

On the web page, some or all of the merchant's offers of goods or services (or deals) can be created by the merchant and displayed for a set period of time. The merchant's deals may be accessible on the web page through the World Wide Web or mobile application software. During that time, potential customers can accept the offer from the merchant's webpage by selecting their acceptance and providing purchasing information, such as the customer's credit card information. In one embodiment, the credit card (or other payment method) will be charged only if the minimum number of customers accept the offer and provide their purchasing information.

The merchant system allows the merchant to promote their own offers or deals using a substantially permanent address, e.g., a persistent uniform resource locator to a web page, and customers know where to go to find the merchant's offers. Further, to the extent the customer allows, the merchant or the website can send relevant deals to particular customers or followers, as described herein. In addition, merchant deals may be selected for further promotion by the provider of the merchant system.

The merchant system also allows the merchant to manage the content of one or more of the deal or deals being offered at that storefront or web page. The merchant can create and/or select the actual deal to be displayed to the customers, including the discounted price or the percentage reduced from the non-discounted price for the goods or services. The merchant can also decide on a number of different offer parameters, such as the minimum number of customers needed to accept the offer for a particular deal to validate the deal, the maximum number of deals being offered, the time limitation to reach the minimum and/or maximum number of accepted offers, redemption locations, custom terms, etc. Further, the merchant can control the creation and number of the offers or deals and the content of those offers displayed on the merchant's web page. In addition, the merchant system may include an algorithm for determining when to offer the deals created by the merchant and for scheduling the deal offers over a time period in a manner, for example, that spreads and/or optimizes actual sales over that time period based on expected consumer demand.

The merchant also has the ability to control the content of the web page. For example, the system may provide embeddable software widgets that merchants can install within their websites to display their deals and updates. The merchant may also hand over control of the content to an outside source, including a professional marketing organization or to the company controlling the system website. In doing so, the merchant can allow an outside party to create and display the offers for the merchant's goods and services.

The merchant system allows the merchant to create and revise deals in real time. Thus, it is not necessary for a deal to be completed before another deal is displayed. Numerous deals may be "running" and displayed at the same time, even if their start and end times differ and if the discount amount or percentage is different from deal to deal. The discount retailing system may include a search engine to allow users to search for deals in an area based on real time deals being created and revised by merchants.

The merchant system allows the merchant to target a group of users based on user attributes, including, for example, existing and/or new customers, customers at desired locations, customers having a desired demographic profile, etc. The merchant may promote their own offers or deals based on known information about users that correlates with preferences or indications of what the users' interests.

The merchant system allows a customer or user to register with the merchant or be followed, or the customer can be profiled. For example, the customer may establish a relationship to follow a merchant based on the purchase and subsequent use of a coupon from that merchant. Also, the system allows a customer to follow merchants based on neighborhoods, time of day, or merchant categories. The customer can thus have first access to particular offers or deals from that merchant as they become available. By following a merchant or merchants, the customer or user's preferences become known which assists in training a recommendation engine. Further, when a customer follows or is followed by, a particular merchant, that merchant's offers are being sent to an audience that has expressed an interest at some time in the merchant's products or services, or similar products or services, thereby increasing the chance that the customer will accept the offer and increasing the number of actual sales. In addition, the system may suggest deals or merchants to follow to the consumer in order to build out the local commerce graph.

Each of the merchant's offers or deals that is created and displayed to a customer, may be filtered and personalized based on that particular customer's previous purchase of (or acceptance to purchase) products or services, and that customer's requests to follow certain merchants. By providing customer profiles or the equivalent, the customer is provided offers for deals that are more relevant to that particular customer.

The system and platform described herein further allows the integration of additional social networking such as Facebook® and Twitter®, among others, as well as the ability to automatically shorten links. User may publish and distribute their entire set of deals (deal feed) such that all of their items will be published to these social networks. By integrating these social networks into the merchant system, customers can communicate deals to their friends, thereby ensuring that the deals reach their minimum number as quickly as possible. Further, using these social networks, customers can provide information and status updates about the deals they have purchased to their friends without acquiring their email addresses and find out about the offers that their friends (or others) have purchased or are watching. In addition, the system website allows users to follow "deal experts" such that users can get expert deal content.

The system website can also suggest deals or merchants to a customer or to a group of customers based on historical data, either from a particular customer that is being followed or based on other information learned as certain offers are accepted or watched and deals are purchased. Accordingly, the website can incorporate data and information to allow customers to feed or be fed offers, receive suggestions, follow others, all incorporated into an e-commerce website that incorporates merchant's web pages, which are authorized by the system website, but in which the merchant's web page content is controlled by the merchant or by another that has been authorized to control the merchant's web page.

Figure 2:
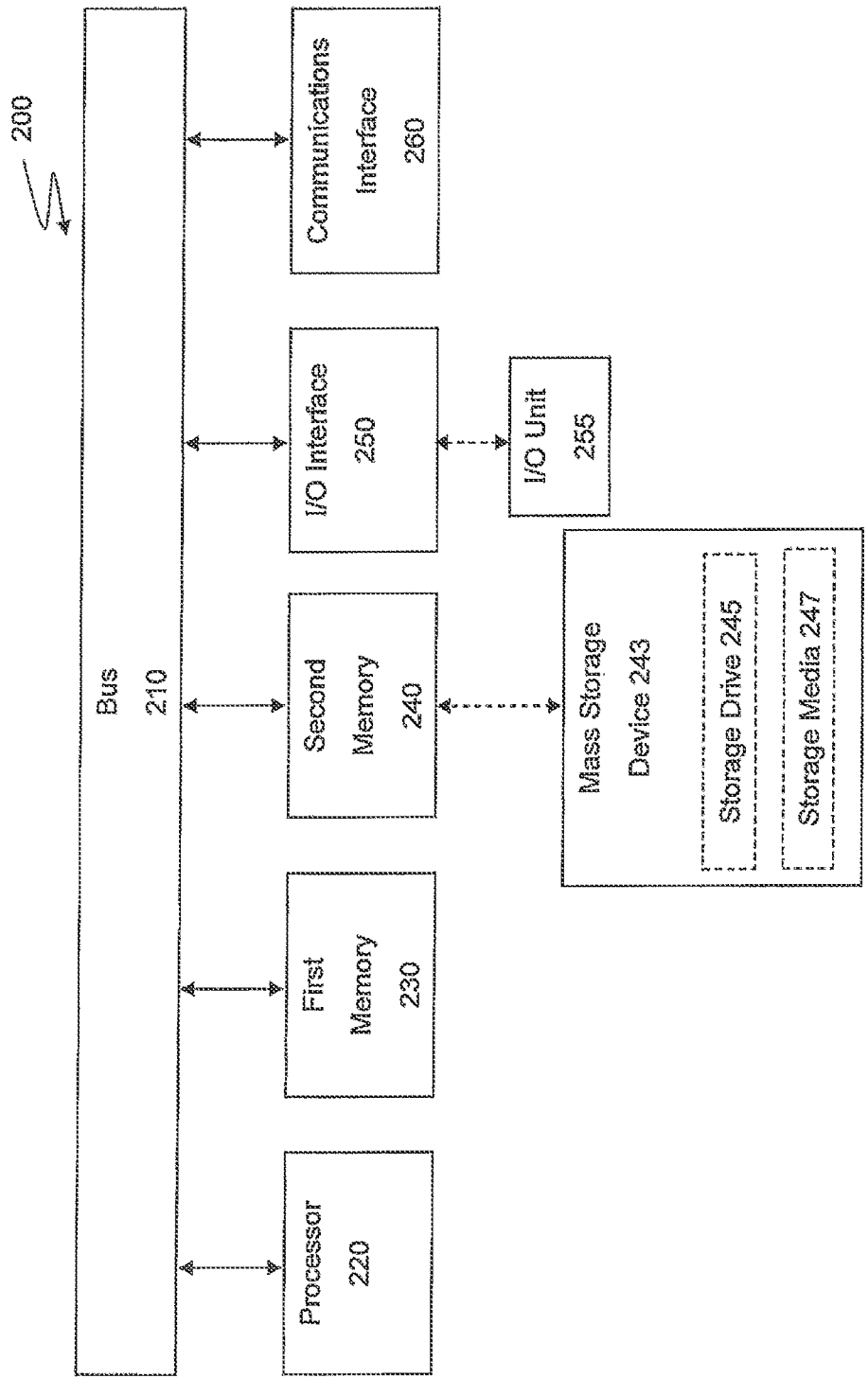
FIG. 2 illustrates an exemplary computer system for implementing certain methods in accordance with the teachings of the present disclosure.

FIG. 2 illustrates an exemplary computer system 200 that may be used to implement the methods according to the present disclosure. One or more computer systems 200 may carry out the methods presented herein as computer code.

One or more processors, such as processor 220, which may be a special purpose or a general-purpose processor is connected to a bus 210. As shown in FIG. 2, bus 210 connects the processor 220 to various other components of the computer system 200, but it is contemplated bus 210 may connect processor 220 to components (not shown) such as, sensors, and servomechanisms. It is also contemplated that bus 210 connects the processor 220 to other computer systems. Via the bus 210, the processor 220 can receive computer code. The term "computer code" includes, for example, programs, instructions, signals and/or data. The processor 220 executes computer code and may further send the computer code via the bus 210.

Computer system 200 may include one or more memories, such as first memory 230 and second memory 240. It is contemplated that the first memory 230, secondary memory 240, or a combination thereof function as a computer readable storage medium to store and/or access computer code. The first memory 230 and second memory 240 may be, for example, random access memory (RAM), read-only memory (ROM), a mass storage device, or any combination thereof.

As shown in FIG. 2, one embodiment of second memory 240 is a mass storage device 243, although it is contemplated that first memory 230 may be the mass storage device. The mass storage device 243 comprises a storage drive 245 and a storage media 247. It is contemplated the storage media 247 may or may not be removable from the storage drive 245. Mass storage devices 243 with storage media 247 that are removable, otherwise referred to as removable storage media, allow computer code to be transferred to and/or from the computer system 200.

A mass storage device 243 may include, for example, a Compact Disc Read-Only Memory ("CDROM"), ZIP storage device, tape storage device, magnetic storage device, optical storage device, Micro-Electro-Mechanical Systems ("MEMS"), nanotechnological storage device, floppy storage device, hard disk device. Mass storage device 243 also includes program cartridges and cartridge interfaces (such as that found in video game devices), removable memory chips (such as an EPROM, or PROM) and associated sockets.

The computer system 200 may further or alternatively include other means for computer code to be loaded into or removed from the computer system 200, for example, input/output ("I/O") interface 250 and/or communications interface 260. Both the I/O interface 250 and the communications interface 260 allow computer code to be transferred between the computer system 200 and external devices including other computer systems. This transfer may be bi-directional or omni-direction to or from the computer system 200.

Computer code transferred by the I/O interface 250 and the communications interface 260 are typically in the form of signals, which may be electronic, electromagnetic, optical, or other signals capable of being sent and/or received by the interfaces. These signals may be transmitted via a variety of modes including, but not limited to, wire or cable, fiber optics, a phone line, a cellular phone link, infrared ("IR"), and radio frequency ("RF") link.

The I/O interface 250 may be any connection, wired or wireless, that allows the transfer of computer code. An I/O interface 250 includes, for example, an analog or digital audio connection, digital video interface ("DVI"), video graphics adapter ("VGA"), musical instrument digital interface ("MIDI"), parallel connection, PS/2 connection, serial connection, universal serial bus connection ("USB"), IEEE1394 connection, PCMCIA slot and card. In certain embodiments the I/O interface connects to an I/O unit 255 such as a user interface, monitor, speaker, printer, touch screen display, to name a few.

The communications interface 260 is also any connection that allows the transfer of computer code. Communication interfaces include, but are not limited to, a modem, network interface (such as an Ethernet card), wired or wireless systems (such as Wi-Fi, Bluetooth, and IR), local area networks, wide area networks, intranets, etc.

The present disclosure is also directed to computer products, otherwise referred to as computer program products, to provide software that includes computer code to the computer system 200. Processor 220 executes the computer code in order to implement the methods of the present disclosure and to provide the functionality described herein. As an example, the methods according to the present disclosure may be implemented using software that includes the computer code, wherein the software is loaded into the computer system 200 using a memory 230, 240 such as the mass storage drive 243, or through an I/O interface 250, communications interface 260, or any other interface with the computer system 200. The computer code in conjunction with the computer system 200 described herein may perform any one of, or any combination of, the steps of any of the methods presented herein. It is also contemplated that the methods according to the present disclosure may be performed automatically, or may be invoked by some form of manual intervention.

The computer system 200 of FIG. 2 is provided only for purposes of illustration, such that the present disclosure is not limited to this specific embodiment. It is appreciated that a person skilled in the relevant art knows how to program and implement the methods according to the present disclosure using any suitable computer system or network architecture.

Figure 3:
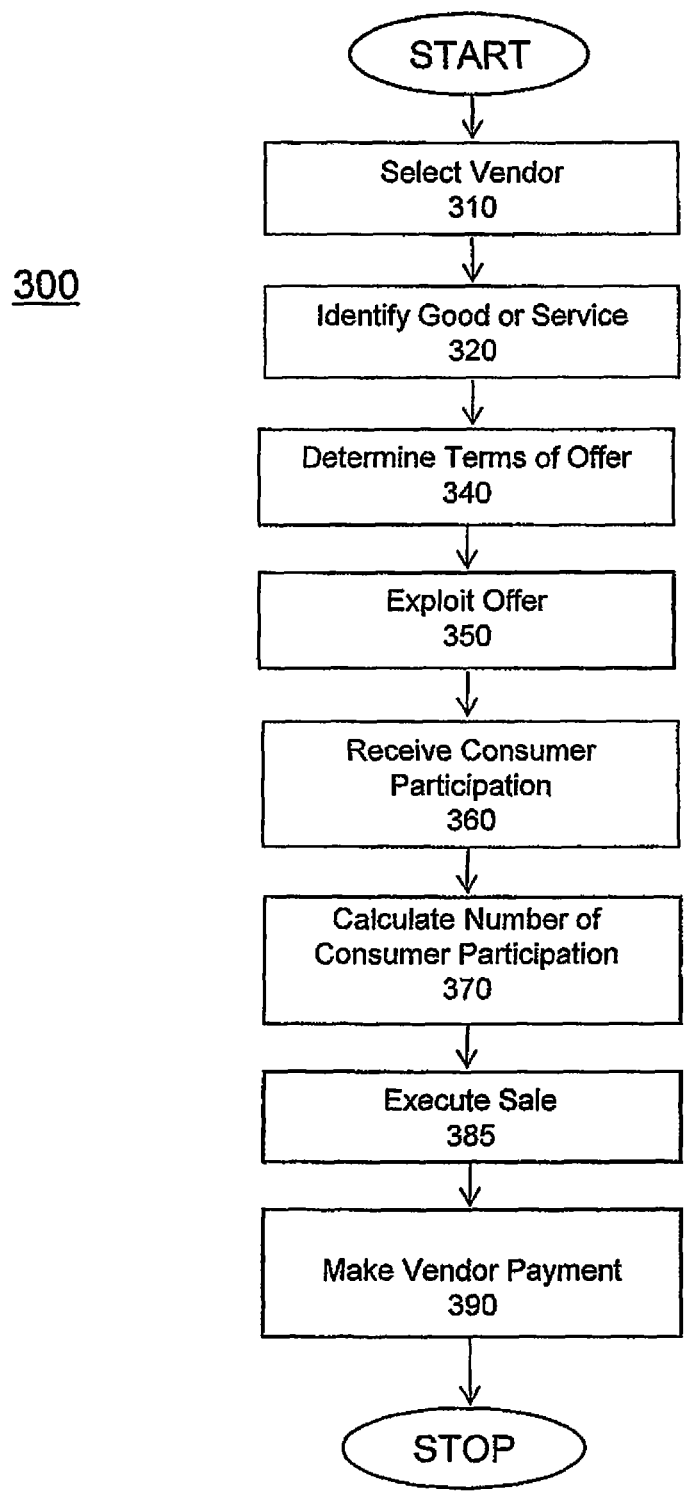
FIG. 3 illustrates another method for discount retailing in accordance with the teachings of the present disclosure.

A method 300 for discount retailing according to another embodiment within the scope of the present disclosure is illustrated in FIG. 3. Similar to the method 100 of FIG. 1, a vendor is selected or obtained at step 310 for participation and a good or service is identified for the process in step 320. In this embodiment, a tipping point may not be established, however, in step 340, terms of the discount offer are determined and include the discount to be provided, duration of the offer, for example 24 hours, and an expiration date of the offer, or other restrictions associated with the offer.

At step 350 the discount offer is exploited through a website on the Internet or on some other global communication network. Consumers participate by accepting the offer such as by "signing up" for the offer on the website. "Signing up" may include providing the name of the consumer, address of the consumer, and form of payment to purchase the offer. The consumer may have already entered personal information that is stored thereby obviating the need to sign up each time to receive an offer. Information about the individual accepting the offer is collected so that the consumer can be charged appropriately at the correct time, which may be when a deal reaches a tipping point (if a tipping point is used), or as soon as the consumer accepts the offer, if there is no tipping point.

At step 360, the consumer participation is received by the system and in step 370, the system calculates the number of consumers that have accepted the discount offer. This calculation can be done on a rolling basis, or at the end of the time limit, which was determined in step 340. Once the offer is accepted by the consumer and the consumer has been charged for the sale of the good or service, the consumer receives an indication that will allow him or her to receive the product or service. For example, the consumer may receive a gift certificate indicating the discount offer.

Once the number of consumers accepting the offer has been calculated and the consumers have been charged in step 385, a vendor payment can be made in step 390. The calculation and payment can occur at the end of the deal, based on a time limit, or the calculation can occur at a number of different time intervals, with numerous checks being sent to the vendor.

In other embodiments, the discount retailing system may not necessarily utilize a tipping point. Rather, merchants may have some or all control over details of the discounted offer or offers that they extend to potential customers. For example, merchants may control the timeframe during which real-time (or near real-time) offers are valid and the timeframe during which the offer can be redeemed. Merchants may target consumers or potential customers based on proximity to merchants' physical locations, and possibly consumer preferences. In other words, if a potential customer indicates that, at that time, he or she is near the geographic vicinity of the merchant that provides the discounted offer (or will be near the vicinity at the proper time of redemption), then that potential customer may receive the discounted offer regardless of any tipping point.

Embodiments of the discount retailing system that do not necessarily utilize a tipping point may be ideal for merchants that wish to communicate real-time offers to potential customers. For example, merchants may wish to extend limited offer time, for example same-day offers, that are valid for a limited redemption period, for example, several hours. By allowing merchants to determine (or program) the specific time period during which the offer is valid, merchants may encourage consumers to do business during off-peak hours or times when the merchant has capacity to sell more product and/or to perform more services. In this embodiment, the merchant is allowed to create and manage in real-time, discounted offers or deals through and by using the discount offering system or platform.

For example, if a restaurant in downtown Boston is having a particularly slow Saturday evening. Through the discount retailing system, the restaurant could generate a 40% off coupon (or a range of discounts or premiums in alternate systems) that is valid for a predetermined time period. The restaurant could generate the offer and define the details of the offer just prior to Saturday evening, or even after Saturday evening is well underway. Through the system described below, consumers could access the offer immediately after the restaurant generates the offer.

In this example, the restaurant has previously established a relationship with the system or platform (or has been validated) so that it is allowed to provide a discounted offer price to its potential customers. In order to establish a relationship, the merchant may have to provide information to the platform (or the owner of the platform). Such information may include the goods or services that the merchant provides, information pertaining to payment for goods or services, a contractual relationship that allows the platform to offer the merchant's goods or services, use the merchant's intellectual property and indemnify the platform from any damages from the goods or services, among other contractual matters.

Once established, in this case, the restaurant determines the amount of the discount (40%), the limited offer time (right before the rush on Saturday evening), and the limited redemption time (that Saturday night). The merchant may also determine a limited number of discounted offers for this particular event. The network or platform may allows the restaurant to send out the discount offer through the platform and the offer is presented to the potential customers that are in the nearby location of the restaurant or intend to be in that area that evening. The potential customers may then have the opportunity to accept the offer (within the limited offer time) and redeem the offer (within the limited redemption time). Of course, the merchant can limit the number of offers so that only the first ten acceptances are allowed or may selectively filter its acceptance based on a programmed criteria.

In one embodiment, the system may generate a number of access codes or unique identifiers and provides them to the merchant before the discounted offer is generated. The access codes may be provided, for example, in a tangible or non-tangible form to the merchant, and the merchant can store the codes in a desired format for future use. Each discount offer made by that merchant may associate a unique or an individual access code to each payment or transaction. Once a potential customer accepts a discounted offer and makes the payment, the customer receives and acknowledgement of acceptance and payment. The acknowledgement may be for example, in a tangible or non-tangible form. In some systems the acknowledgement may comprise an email to be printed or displayed on a mobile device and will contain one of the access codes provided to the merchant. This way, when a customer presents the acknowledgement to the merchant. The merchant (and/or the platform) can determine that the acknowledgement is valid and not a forgery or photocopy. The use of unique codes in this manner also allows the merchant to accept and track each code manually without having real-time communication with the system or platform. The access codes may also be generated by the platform or merchant in real time, as customers accept the discounted offers and make payment.

Like some of the other embodiments, the payment may be made through and to the platform or system, and the acknowledgement may be sent from the platform or a surrogate system in communication with the system. Subsequently, real or electronic funds received for the discounted offer are sent to the merchant and any fees for the services provided can be removed from the total revenue received.

A further aspect of extending real-time offers may involve targeting consumers based on information that is known about specific consumers or gathered during the solicitation. Such information may include many types of information such as, for example and without limitation, personal information, likes, dislikes, purchase history, preferences, and so on.

In addition, the system may target consumers based on consumers' locations. Accordingly, a merchant could extend offers to those consumers who are present or will be present in the vicinity of the merchant during a timeframe when the merchant wishes to stimulate business. Consumers who are nearby the merchant's location may be more inclined to visit the merchant's location and/or accept the merchant's offer than consumers who are not nearby the merchant's location. By strategically targeting consumers based on proximity to the merchant's physical location, marketing costs may be reduced or at least spent more efficiently. As an additional result, merchants may sell more product and/or perform more services when compared with the results of traditional forms of advertising and promotion.

Still further, the discount retailing system may allow merchants to manage the relevance of the offers they extend by controlling the quantity of the offers. For example, perhaps a deep sea fishing outfit in Tampa, Fla. has three people cancel reservations for an afternoon fishing excursion that was originally planned for ten customers. Regardless of whether the three that cancelled may obtain refunds, the fishing outfit would still like to capitalize on the openings since the boat will be going out with the other seven customers despite the cancellations. Using the discount retailing system, the fishing outfit could generate an offer for a half-priced fishing excursion several hours before the excursion departs. To prevent overbooking, though, the fishing excursion could limit the number of offers to three. In this example, three unique identifiers or access codes may be associated with each of the customers that accept the offer and make the payment. If a fourth customer shows up for the excursion with an acknowledgement, the platform can determine which of the four acknowledgements is not valid.

The system also allows merchants to limit the timeframe during which such offers are valid, to target consumers based on consumer location, and to limit the number of offers extended so as to manage the relevance of the offers. For example, a dentist in Portland, Oreg. may have one spot free up for an appointment that was scheduled to start in a half hour. To avoid downtime between appointments, the dentist may use the system to target clients. Instead of extending a discount on an appointment to clients from the greater Portland area, many of whom may live beyond a half hour away, the dentist may use the system to target a client who is within fifteen minutes of the dentist's office or patients that are predicted to reach a destination within a certain time ranges. Since only one spot is available, the dentist could also limit the discount to the first client that accepts. Moreover, the dentist could also limit the discount such that if not accepted within a half hour, the discount expires.

Another way that merchants can manage the relevance of offers is by modifying the details of the offer after it is already posted. For example, perhaps a restaurant posts an offer for 15% off entrees from 3-5 P.M. one weekday. If by 4 P.M. few or no customers have accepted the offer, the restaurant may wish to increase the attractiveness of the offer to 30% off entrees for the next hour. Conversely, the discount could be reduced if the restaurant were to see a strong initial customer response.

One way for merchants to increase their customer base through the use of the discount retailing system is by varying the frequencies of the offers and the details of the offers. Some, many, or even most consumers are capable of noticing patterns in promotional advertising from the same merchant. For example, if a restaurant consistently offers dinner specials starting at 9 P.M., many patrons may wait until 9 P.M. to have dinner at the restaurant. By varying the frequencies and details of the offers, merchants may discourage patrons from limiting their purchases to the terms of those offers. Further, by extending offers at different timeframes, on different days, at varying discounts, and so on, merchants may entice first-time customers, or at least a wider variety of customers, to do business with the merchant.

Along these lines, merchants could also use the discount retailing system to analyze which consumers, whether first-time customers or long-time patrons, respond to which offers. An even further element of analysis is possible with the system since, in many cases, the location of consumers may be tracked as offers are extended to consumers. For example, based on consumers' and merchants' locations, the system could track when a consumer views an offer and proceeds towards the merchant's location, but yet fails to accept the offer.

Figure 7:
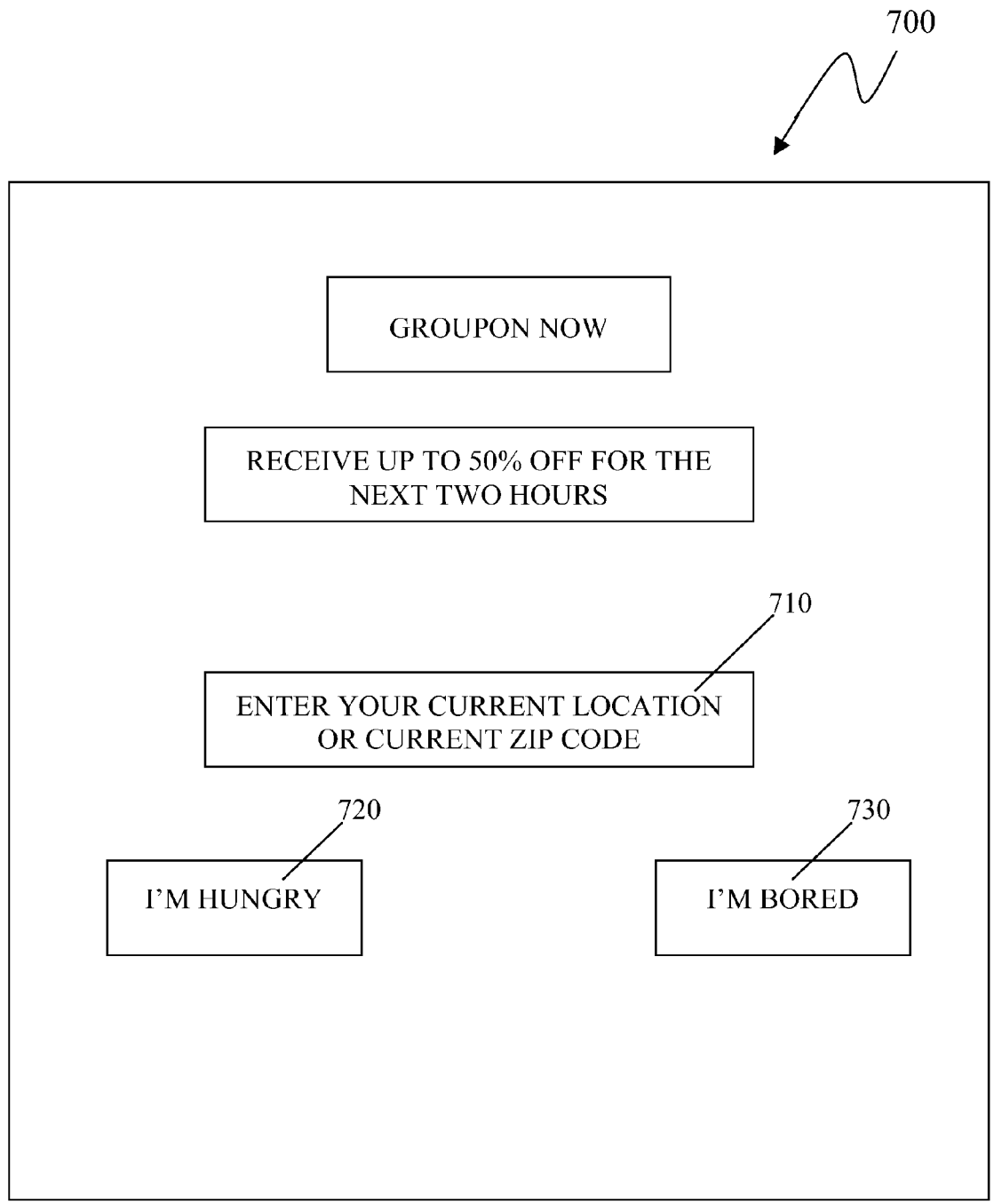
FIG. 7 illustrates an embodiment of an on-line web page or screen in which users can request discount offers in accordance with the teachings of the present disclosure.

FIG. 7 shows an exemplary request web page or screen 700 that can be accessed on-line by a user of the platform. The request screen can be displayed on a potential customer's computer, cell phone or any of the other computing and mobile computing devices described herein. The user can access request screen 700 in order to obtain discount offers in the near vicinity (or where the user will be located at a particular time) that may be limited in time to accept and limited in time to redeem.

The user can access the request screen 700 to inform the platform of the user's location and request for discounted offers in or near that location. For example, the user can access the screen 700 and enter the user's present location in the location box 710. This can be done by entering location indicia such as a zip code, street address, or through the user's GPS system on a mobile device or navigational system or an IP address geolocation service for a web based user platform. Once the location is determined or provided, the user can request a discounted offer for a nearby restaurant by selecting the I'M HUNGRY box 720, or the user can request a discounted offer for a nearby activity by selecting the I'M BORED box 730.

Once the information is entered, the platform will provide a number of offers to that user for the types of goods or services requested. These offers may be conditional offers which may have a limited time of acceptance and/or a limited time of redemption (and may also be limited in the number that can be accepted). The system may also allow for a minimum of offers to be accepted before the offer is valid.

Further, the actual discounted offers may be varied for different users depending on the user's profile or other information, such as historical data (the user used a discount coupon at that restaurant the day before or has written a bad review about the restaurant previously). Based on the discounted offers presented, the user will then have a choice to accept one (or more) of the discounted offers presented and then redeem in the time required.

As an example, if a user is hungry and requests a restaurant in the 60606 zip code, the platform will check to see which restaurant merchants have set up discounted offers in that zip code for that particular time. The platform may review the user's profile and information (if accessible) and provide any matching discounted restaurant offers and the related time limitations (for accepting and redeeming) to that user. Additional limitations may include a minimum or maximum number of discounted offers that can be accepted before the offer is valid or withdrawn.

Further, once the user accepts the discounted offer, the user is charged the amount of the discount offer upfront and receives a coupon. If the offer is to pay $3.00 for a $5.00 hamburger at Joe's Hamburgers, the user will make the payment immediately upon accepting the offer, such as through the user's credit card or an electronic payment server or service like Paypal, and be able to walk into Joe's Hamburgers, redeem the coupon and receive the hamburger.

To securely effect the transaction, the platform may assign the merchant a certain number of access codes, each to be provided with an acknowledgement or coupon. As such, the user that accepted the discount offer and made a payment, will receive one of these access codes with the coupon. Upon redeeming the coupon, the platform will disable that access code thereby preventing others from using that access code to receive the same deal.

The merchant can control the discounted offers that are made in real time or after some delay. If a merchant had a light lunch crowd between 11:30 AM and 1:30 PM and has a particular $6.00 sandwich that did not sell well that day, the merchant can make a discounted offer for $3.00 for that sandwich to the first 15 customers that accept the offer by 2:30 PM and redeem the coupon before 3:30 PM. The first 15 customers that accept the offer and provide payment information receive a coupon (and one of the 15 access codes assigned to each coupon). Each of the 15 users that show up with the coupon (or an electronic coupon on the user's cell phone for example), may redeem the coupon and receive the sandwich. The system or platform receives all payments for the accepted limited time discounted offers, removes any service fees and then transfers the remaining amount to the particular merchant.

Figure 8:
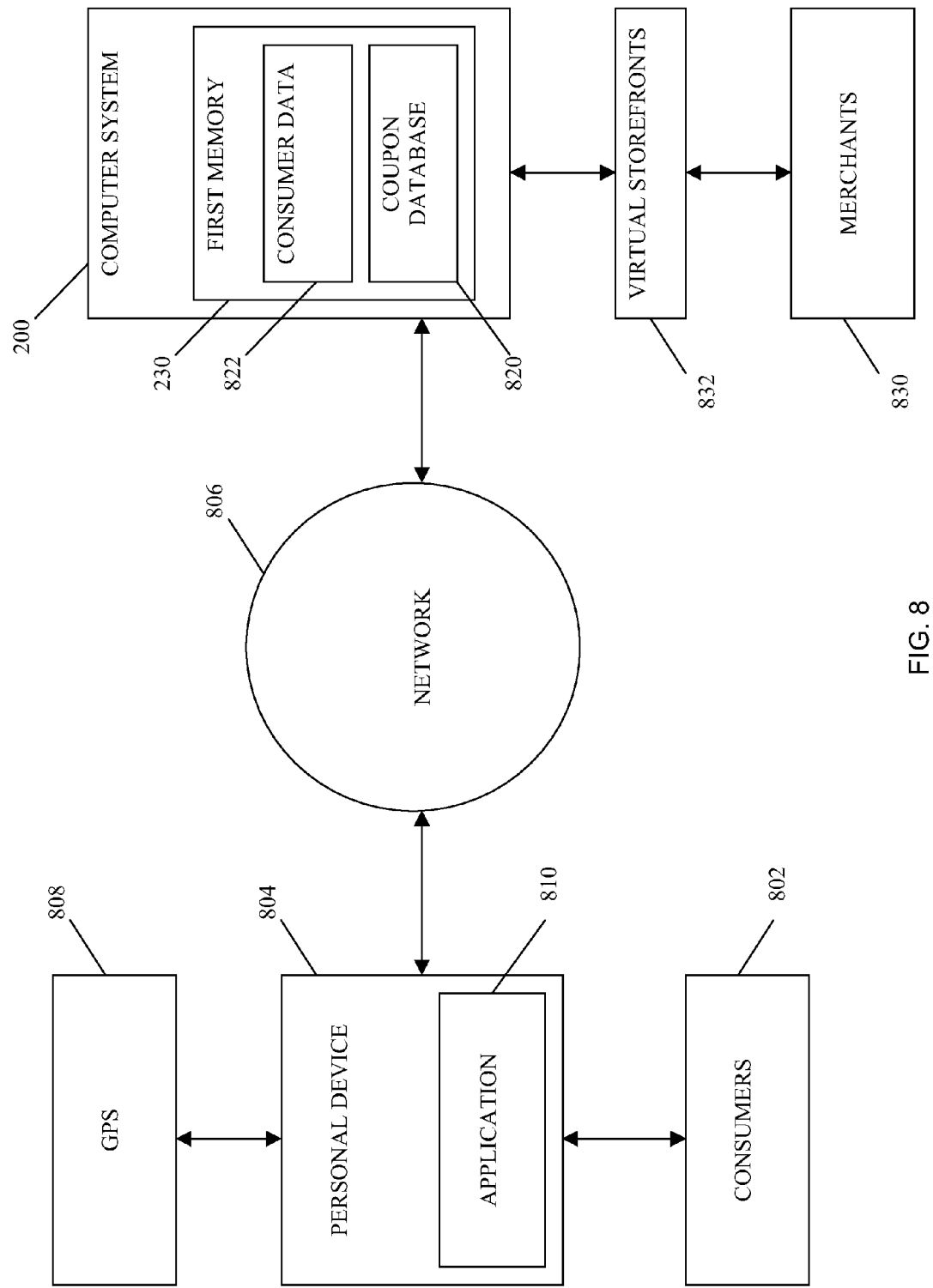
FIG. 8 illustrates an exemplary network architecture for implementing certain methods in accordance with the teachings of the present disclosure.

To provide such exemplary functions, the discount retailing system may use a variety of components. FIG. 8 shows one of many possible network architectures for the discount retailing system that may help implement the methodologies of the present disclosure. A consumer 802 may use a personal or mobile device 804 to connect to a network 806 that is in further communication with the computer system 200. In other embodiments, a different computer system may be used instead of computer system 200. Notwithstanding, the personal device 804 may include without limitation mobile phones, smartphones, personal digital assistants (PDAs), computers, tablets, mp3 players, iPod touches, e-readers, digital cameras and camcorders, automobile entertainment systems, navigation systems, and so on. Moreover, each personal device 804 may belong to one or more consumers 802 who interact with the personal device 804. In some instances, the personal device 804 may be transportable such that consumers 802 carry the personal devices 804 from one place to another. In other instances, the personal device 804 may be relatively stationary or even affixed to another piece of property.

In any event, the personal device 804 may have GPS functionality. In these embodiments, a GPS 808 may determine the location of the personal device 804 based on data exchanges between the GPS 808 and the personal device 804.

In addition, the personal device 804 may include an application 810 that the consumer 802 may operate. Operation may include downloading, installing, turning on, unlocking, activating, or otherwise using the application 810. The application 810 may comprise at least one of an algorithm, software, computer code, and/or the like, for example, mobile application software. In the alternative, the application 810 may be a website accessible through the world wide web.

The application 810 may organize input from the personal device 804 and transmit such input to the computer system 200 via a physical or virtual network 806. The application 810 may also organize and display output received from the computer system 200 for the consumer 802, as will be described below. More specifically, the application 810 may allow the consumer 802 to request offers based on interests or needs that the consumer 802 indicates. The application 810 may acquire the location of the personal device 804 from the GPS 808, and in some instances, historical location information, and transmit the location to the computer system 200.

The network 806 of the network architecture 800 may be any suitable network such as, for example, a publicly accessible distributed network like the Internet or other telecommunications network. In short, the network 806 may facilitate the exchange of data between the personal device 804 and the computer system 200. Further, memory located in or associated with the network will contain the algorithms or applications for running the platform and providing the functionality described herein.

The first memory 230 of the computer system 200 may include an offer database 820 and consumer data records or database 822. Merchants 830 may populate the offer database 820 with offers as they desire. In some embodiments, the merchants 830 may use a virtual storefront 832 to specify and transmit the details of offers. The virtual storefront 832 may be a website that is specific to a particular merchant 830. In one embodiment, consumers 802 may have access to both the virtual storefront 832 for each merchant and the application 810. In another embodiment, the consumers 802 may only have access to the application 810. In yet another embodiment, each merchant 830 need not necessarily have its own virtual storefront 832. In other words, merchants 830 may access a shared portal for transmitting offers to the system, whether the shared portal is a website, a program, etc. Merchants 830 could log in to the shared portal with a unique username and password.

Still further, the system may compile information about specific consumers 804 in the consumer data records 822. For example, such information about consumers 804 may include without limitation current locations, buying habits, recurring routes, preferences, interests, favorite merchants, purchase times, times at which offers are requested, and types of offers requested. Registered merchants 830 may then use this information from the data records 822 to develop even more intelligible targeting schemes. For example, a merchant 830 could generate different offers for different consumers 802. Or the merchant 830 could extend a personalized offer to a consumer 802 during a specific time during the week when the consumer 802 has purchased products from the merchant 830 in the past. Or the merchants 830 could analyze the data to determine which offers are most successful. One way for the merchants 830 to obtain this information is through accessing their virtual storefronts 832 or the shared portal.

The processor 220 of the computer system 200 may perform the operations of the computer system 200. To illustrate, the processor 220 may organize and analyze raw data received from the personal devices 804. The processor 220 may then store this data in the data records 822 for merchant access. Similarly, the processor 220 may select offers in the offer database 820 based on the types of products and/or services that in some cases have been requested from the personal device 804 of the consumer 802. Selecting may include matching, filtering, choosing, deciding, electing, marking, picking, sorting, or otherwise refining the total number of offers before presentment to the consumer 802. The processor 220 may additionally, or in the alternative, select offers based on the locations of the consumers 802. Still further, the processor 220 may render expired offers in the offer database 820 as being no longer redeemable. The tasks of the processor 220 are merely exemplary, as are the criteria upon which the processor 220 may use to select offers for presentment to the consumer 802.

After valid offers from the offer database 820 are selected, in some cases based on the criteria discussed above, the computer system 200 may convey or transmit such offers back to the personal device 804. The application 810 of the personal device 804 may organize the offers and present them to the consumer 802 in a user-friendly format. For example, the application 810 may display the offers in a chart that indicates the offer, the distance from the consumer 802 to the merchant 830, and the expiration time or quantity available. As a further example, the application 810 may present the offers to the consumer 802 as being graphically superimposed onto a localized map.

Although some of the features of the system have been described as occurring onboard the computer system 200, the present disclosure contemplates many other configurations and alternate systems. For instance, the offer database 820 and consumer data records 822, or copies or subsets thereof, may be maintained in onboard memory of the personal device 804. The discount retailing system could continuously update the offer database 820 onboard the personal device 804 based on the consumer's home city, current location, frequented or planned routes, or so on. The application 810, then, could select and suggest offers from merchants 830 based on, for example, the consumer's location, preferences, likes, dislikes, purchase history, current needs, and/or data stored in the consumer data record 822. One scenario where this configuration may be particularly helpful is where a consumer is indoors and only has limited connectivity to the network 806.

Another aspect of the application 810 may allow consumers 802 to set preferences concerning the discount retailing system. One preference may pertain to the timeframes during which the application 810 on the personal device 804 may present the consumer 802 with offers. Some consumers 802 may prefer that offers are only presented to them when specifically requested. If so, the application 810 may allow a consumer 802 to select a category of offers such as, for example and without limitation, entertainment, food, socializing, exercise, or grooming. The application 810 may also ask the consumer 802 to input the amount of time that the consumer 802 has to partake in such an activity. The application 810 or the computer system 200 may use this input and, in some instances, other criteria, as discussed above, to select which offers should be presented to the consumer 802.

Other consumers 802 may prefer to receive all offers that become available, or at least specialized subsets thereof. The application 810 may allow a consumer 802 to select one of a number of levels that vary from "light" advertising to "heavy" advertising. Additionally or in the alternative, consumers 802 could designate certain timeframes during the day, week, month, and/or year during which offers may or may not be presented. Consumers 802 could also designate certain locations wherein the system would only present offers when the personal device 804 is within the designated location. Still another preference may involve receiving offers on a routine basis from only those merchants 830 that a consumer 802 designates. Yet other exemplary preferences may pertain to how often offers are presented, what type or category of offers are presented, a threshold degree of discount for presentment, and so on.

Once the consumer 802 is presented with offers from merchants 830, the consumer 802 may wish to accept an offer. The discount retailing system contemplates many methods through which the consumer 802 may take advantage of a particular offer that the application 810 presents.

The consumer 802 may select a desired offer by indicating so through the application 810 on the personal device 804. The application may send a signal via the network 806 to the computer system 200 indicating that the consumer 802 would like to accept the offer from a particular merchant 830. Thereafter, the computer system 200 may generate an alphanumeric code, an electronic serial bar code, or some other unique identifier that is transmitted to both the application 810 of the personal device 804 and the merchant 830. In the alternative, merely information associated with the unique identifier may be sent to the merchant 830 so that the merchant 830 can recognize the unique identifier. The consumer 802 may then show the merchant 830 the unique identifying information upon redeeming the offer for the product, service, etc. It should be noted that real-time offers may also work in conjunction with the point system, as described previously.

Although the discount retailing system has been described as collecting real-time offers from a plurality of merchants, the present disclosure also contemplates usage of the system by as few as one merchant. However, there may be benefits to having real-time offers collected centrally. In addition, where the discount retailing system is used with a plurality of merchants, consumers may choose to "follow" particular merchants, as described in more detail above. Following a particular merchant may allow the consumer to view all of the offers from the particular merchant, regardless of whether the consumer is within the vicinity of the merchant. Certain merchants may even provide special offers for its followers.

Figure 9:
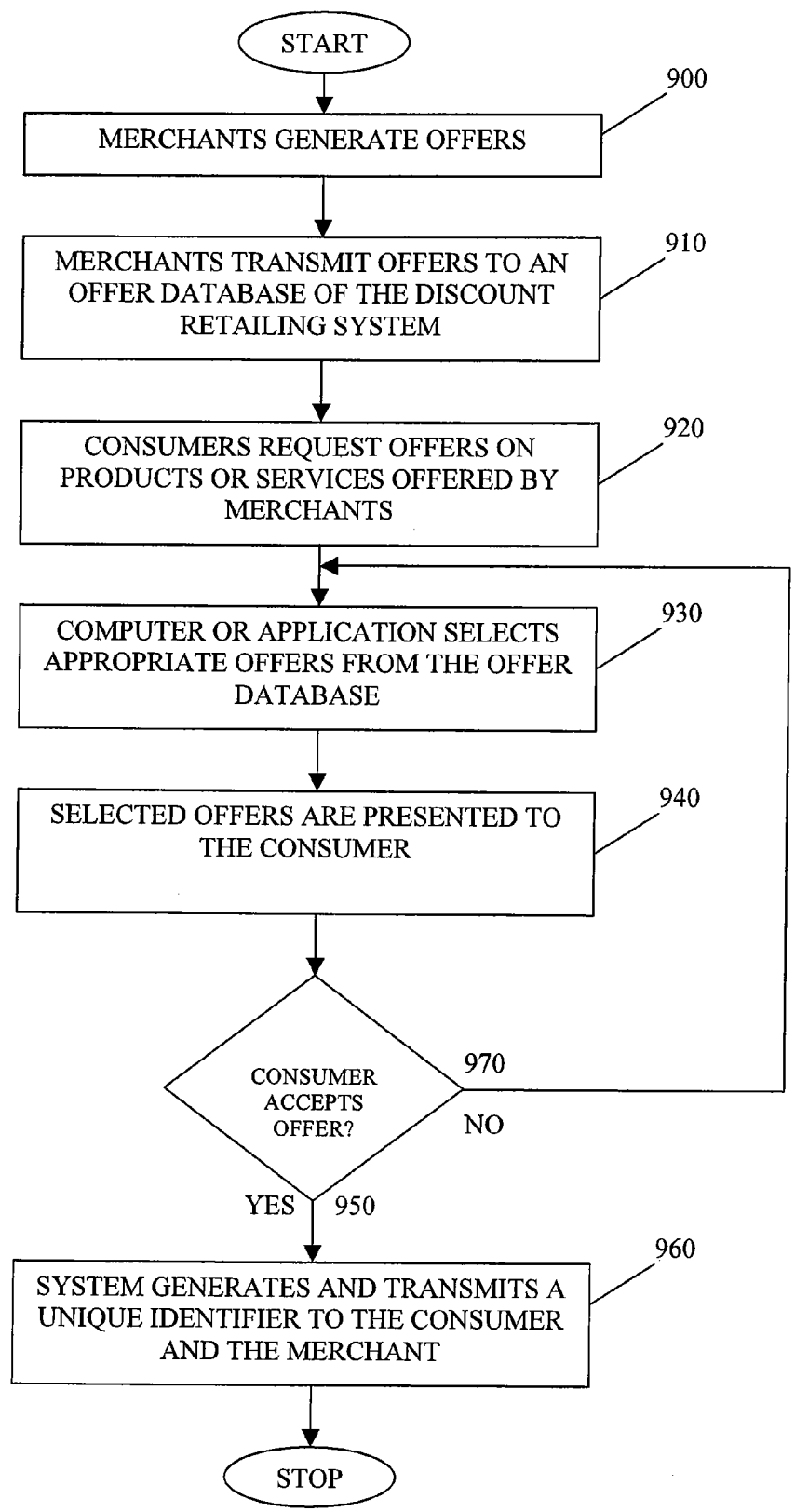
FIG. 9 illustrates a method of discount retailing in accordance with the teachings of the present disclosure.

While the method of operating the discount retailing system with real-time offers has been described in some detail, FIG. 9 provides additional insight as to how the system functions in one embodiment. Initially, merchants may generate real-time offers 900 in hopes of attracting consumers to do business with the merchants. As part of generating offers, merchants may need to define the terms and conditions of the offer, which may include, for example, the content of the offer, which consumers will be targeted, timeframe of the offer, and so on. After merchants generate offers, merchants may transmit the offers to an offer database of the discount retailing system 910. Merchants may independently transmit offers to the offer database at any point in time, as offers may be made available to consumers as soon as the system receives the offers. As discussed above, one way for the merchants to communicate with the system is to provide a virtual storefront for each merchant.

At some point after the merchants transmit offers to the offer database 910, consumers may request offers on products or services 920 based on any combination of criteria as described above. For example, a consumer may request offers on nearby entertainment services available within the next two hours. One way for the consumer to request offers is through a personal device that is in communication with the discount retailing system. Also, the offer presented to the consumer may be based on the location of the consumer at the time and also based on information previously obtained about that consumer.

A computer or an application of the discount retailing system may select appropriate offers from the offer database 930 based on various criteria. Criteria may include, for example, location of the user at that time (or at a time in the future that is requested), data stored in consumer data records, current interests or needs of consumers, historical interests of consumers, proximity of consumer to merchant, and so on. Selected offers may then be presented to the consumer for review 940.

As described, if the consumer accepts an offer 950, the system can transmit an access code or a unique identifier to the consumer along with a coupon (paper or electronic). These access codes may have been previously provided to the merchant 960 or may be generated at the time of acceptance of the discounted offer (and transmitted to the merchant and the user). In doing so, the system may prevent unauthorized redemption of coupons or redemption of copied or counterfeit coupons. The consumer may then present the coupon and the related unique identifier to the merchant when the offer is redeemed. However, the consumer may choose not to accept any of the offers that are presented 970. If so, the computer or the application may select different offers from the offer database 930 and present these different offers to the consumer 940.

In still another embodiment, it is contemplated that consumers could request offers from specific merchants or certain categories of merchants even though the merchants do not have any existing offers on the system. During peak hours, days, weeks, and/or months, merchants may have little incentive to act on a request from a consumer for an offer. Yet at times when business is slow, merchants may choose to respond to requests for offers from consumers. This may be especially true when dealing with potential first-time customers.

To illustrate the aforementioned embodiment, consider a consumer that has recently relocated to Denver, Colo. The consumer is looking to join a health club, but does not know much about the options and cannot locate any existing promotions. The consumer may send a request through the discount retailing system to a category of local merchants, that is, local health clubs. A club that is doing well may choose not to respond. Yet a club that is in need of business may generate an offer in response to the consumer's request in hopes of attracting the consumer to purchase a membership.

The discount retailing system also contemplates embodiments wherein merchants can extend real-time offers and utilize a tipping point. Consider, for example, a river rafting tour guide that knows that Tuesday afternoons are typically slow. Moreover, the guide knows he must have at least three customers paying full price in order to net a profit and hence make conducting the tour worthwhile. At some point on Monday afternoon or Tuesday morning, the tour guide could use the discount retailing system to post six half-price offers for the Tuesday afternoon tour. The offers could target those potential customers that are located within the vicinity of the tour guide's place of operation. The tour guide could specify a tipping point of six so that the offers are not effective until six customers commit to the deal. By using a tipping point, the tour guide prevents having to conduct a tour for a loss. Depending on capacity, the guide may also limit the quantity of offers as well.

The described embodiments are to be considered in all respects only as illustrative and not restrictive, and the scope of the disclosure is, therefore, indicated by the appended claims rather than by the foregoing description. Those of skill in the art will recognize changes, substitutions and other modifications that will nonetheless come within the scope of the disclosure and range of the claims.

What is claimed is:

1. A method of offering discounted goods or services over a discount platform in which a merchant is allowed to provide a discount offer to a potential customer when said potential customer indicates a location near where said merchant is providing the goods or services, said offer being valid for a limited offer time, and being redeemable for a limited redemption time, comprising a network server, a microprocessor, a memory and computer software, said computer software being located in said memory and run by said microprocessor, said computer software comprising a location based discount offer algorithm, wherein said location based discount offer algorithm comprises the steps of:
   (a) establishing a relationship with a merchant, said relationship including receiving information from said merchant pertaining to goods or services provided by said merchant;
   (b) allowing said merchant to determine a discount offer price for a particular good or service to be provided by said merchant, said discount offer price being a reduction in amount from a standard offer price for said particular good or service;
   (c) allowing said merchant to determine a limited number of discount offers to be provided by said merchant;
   (d) allowing said merchant to determine said limited offer time for said discount offer price to be valid;
   (e) allowing said merchant to determine said limited redemption time for said potential customer to redeem said discount offer price;
   (f) providing at least one access code to said merchant, said at least one access code correlating to each of said limited number of discount offers provided by said merchant;
   (g) determining when said potential customer is located near the location where said merchant can provide the particular good or service;
   (h) presenting to said potential customer located near the location that said merchant can provide the particular good or service, said discounted offer price, said limited offer time and said limited redemption time.

2. The method of offering discounted goods or services over a discount platform in claim 1, further comprising the steps of:
   (i) receiving an acceptance of the discounted offer price from the potential customer located near the location that said merchant can provide the particular good or service,
   (l) determining if said acceptance occurred during said limited offer time; and
   (j) receiving a payment associated with the acceptance of the discounted offer price from said potential customer if said acceptance occurred during said limited offer time;
   (k) associating an access code to the acceptance of the discounted offer price; and
   (l) providing an acknowledgement that said payment has been received.

3. The method of offering discounted goods or services over a discount platform in claim 2, further comprising the steps of:
   (m) allowing for the redemption of the discount offer price for the particular good or service if said redemption occurred during said limited redemption time and said access code is valid.

4. The method of offering discounted goods or services over a discount platform in claim 1, wherein said establishing a relationship means contracting with the merchant to provide discounted goods and services on the discount platform.

5. The method of offering discounted goods or services over a discount platform in claim 4, wherein said contracting with the merchant means allowing said platform to receive payments for the merchant to provide goods and services to potential customers.

6. The method of offering discounted goods or services over a discount platform in claim 1, wherein said merchant is allowed to provide said limited offer time discount offer price directly into the discount platform.

7. The method of offering discounted goods or services over a discount platform in claim 1, wherein said merchant is allowed to provide said limited offer time directly into the discount platform.

8. The method of offering discounted goods or services over a discount platform in claim 1, wherein said merchant is allowed to provide said limited redemption time directly into the discount platform.

9. The method of offering discounted goods or services over a discount platform in claim 1, wherein providing said at least one access code to said merchant occurs prior to said merchant determining a discount offer price for a particular good or service.

10. The method of offering discounted goods or services over a discount platform in claim 1, wherein providing said at least one access code to said merchant occurs subsequent to said merchant determining a discount offer price for a particular good or service.

11. The method of offering discounted goods or services over a discount platform in claim 1, wherein the number of access codes provided is the same as the number of acceptances of discount offers during the limited offer time.

12. The method of offering discounted goods or services over a discount platform in claim 1, wherein near the location means in the same zip code as the merchant providing the particular good or service.

13. The method of offering discounted goods or services over a discount platform in claim 1, wherein near the location means in the same zip code as the merchant providing the particular good or service during the limited redemption time.

14. A discount offering system for allowing a merchant to provide a discount offer to a potential customer when said potential customer indicates a request and a location near where said merchant is providing the goods or services, comprising:
- a network server, said network server configured to store and operate a discount offer application for presenting a discount offer for a particular good or service to a potential customer located within the vicinity of where said particular good or service will be redeemed during a limited redemption time;
- a merchant terminal, said merchant terminal being configured to access said discount offer application and being located remotely from said network server, said merchant terminal allowed to access said discount offer application, such that a merchant can enter a discount offer information into said merchant terminal pertaining to said discount offer for said particular good or service;
- said network server further configured to receive the discount offer information from said merchant terminal and to present said discount offer information to potential customers that will be near the vicinity of the merchant providing the particular good or service during the limited redemption time, said discount offer being presented for a limited offer time and if accepted during said limited offer time, said discount offer must be redeemed by said potential customer during said limited redemption time;
- said network server further being capable of receiving from a potential customer an acceptance of and payment for said discount offer for a particular good or service, said network server further being capable of providing an acknowledgement of said payment and an at least one access code for said transaction.

15. The discount offering system for allowing a merchant to provide a discount offer to a potential customer of claim 14, wherein said discount offer information is a discount offer price for a particular good or service.

16. The discount offering system for allowing a merchant to provide a discount offer to a potential customer of claim 14, wherein said discount offer information is a limited offer time for a discount offer for particular good or service.

17. The discount offering system for allowing a merchant to provide a discount offer to a potential customer of claim 14, wherein said discount offer information is a limited redemption time for a discount offer for a particular good or service.

18. The discount offering system for allowing a merchant to provide a discount offer to a potential customer of claim 14, wherein said discount offer information is a limited number of discount offers to be provided by said merchant.

19. The discount offering system for allowing a merchant to provide a discount offer to a potential customer of claim 14, wherein said at least one access code corresponds to each of the limited number of discount offers to be provided by said merchant.

* * * * *